(12) United States Patent
Ellice-Flint et al.

(10) Patent No.: US 12,407,164 B2
(45) Date of Patent: Sep. 2, 2025

(54) ELECTRICAL POWER CONTROL METHOD AND SYSTEM

(71) Applicant: Applied Hybrid Energy Pty Ltd, Sydney (AU)

(72) Inventors: John Charles Ellice-Flint, Sydney (AU); Petar Branko Atanackovic, Sydney (AU)

(73) Assignee: Applied Hybrid Energy Pty Ltd, Sydney (AU)

( * ) Notice: Subject to any disclaimer, the term of this patent is extended or adjusted under 35 U.S.C. 154(b) by 0 days.

(21) Appl. No.: 18/319,413

(22) Filed: May 17, 2023

(65) Prior Publication Data

US 2023/0307910 A1    Sep. 28, 2023

Related U.S. Application Data

(63) Continuation of application No. 16/792,580, filed on Feb. 17, 2020, now Pat. No. 11,689,018, which is a (Continued)

(30) Foreign Application Priority Data

Jun. 12, 2013   (AU) ................................ 2013902126

(51) Int. Cl.
*H02J 3/06*        (2006.01)
*G06Q 50/06*    (2024.01)
(Continued)

(52) U.S. Cl.
CPC .............. *H02J 3/06* (2013.01); *G06Q 50/06* (2013.01); *H02J 3/003* (2020.01); *H02J 3/008* (2013.01);
(Continued)

(58) Field of Classification Search
CPC .... H02J 3/06; H02J 3/003; H02J 3/008; H02J 3/32; H02J 3/38; H02J 3/381; H02J 3/46; H02J 13/00016; H02J 13/00024; H02J 13/00026; H02J 2300/20; H02J 2300/22; H02J 2300/24; H02J 2300/28;
(Continued)

(56) References Cited

U.S. PATENT DOCUMENTS 6,697,951 B1    2/2004   Sinha et al.
6,745,105 B1    6/2004   Fairlie et al.
(Continued)

OTHER PUBLICATIONS

Eaton, Cutler-Hammer ATC-800 "Closed/Open Transition Transfer Switch Controller", Eaton, Mar. 2001. Retrieved from www.eaton.com/content/dam/eaton/products/low-voltage-power-distribution-controls-systems/ats/resources/atsc8-lbat-c103.pdf.
(Continued)

*Primary Examiner* — M. N. Von Buhr
(74) *Attorney, Agent, or Firm* — The Webb Law Firm

(57) ABSTRACT

A method and system for controlling the transfer of electrical power between a first electrical network and a second electrical network is disclosed. The method includes receiving at the second electrical network pricing information from the first electrical network, the pricing information associated with the supply of electrical power between the first electrical network and the second electrical network and modifying a demand characteristic of the second electrical network based on the pricing information.

32 Claims, 25 Drawing Sheets

Related U.S. Application Data continuation of application No. 14/897,945, filed as application No. PCT/AU2014/000605 on Jun. 12, 2014, now Pat. No. 10,566,792.

(51) Int. Cl.
*H02J 3/00* (2006.01)
*H02J 3/32* (2006.01)
*H02J 3/38* (2006.01)
*H02J 3/46* (2006.01)
*H02J 13/00* (2006.01)

(52) U.S. Cl.
CPC .................... *H02J 3/32* (2013.01); *H02J 3/38* (2013.01); *H02J 3/381* (2013.01); *H02J 3/46* (2013.01); *H02J 13/00016* (2020.01); *H02J 13/00024* (2020.01); *H02J 13/00026* (2020.01); *H02J 2300/20* (2020.01); *H02J 2300/22* (2020.01); *H02J 2300/24* (2020.01); *H02J 2300/28* (2020.01); *Y02E 10/56* (2013.01); *Y02E 40/70* (2013.01); *Y02E 60/00* (2013.01); *Y02E 70/30* (2013.01); *Y04S 10/123* (2013.01); *Y04S 10/14* (2013.01); *Y04S 40/124* (2013.01); *Y04S 40/126* (2013.01); *Y04S 50/10* (2013.01)

(58) Field of Classification Search
CPC ......... G06Q 50/06; Y02E 10/56; Y02E 40/70; Y02E 60/00; Y02E 70/30; Y04S 10/123; Y04S 10/14; Y04S 40/124; Y04S 40/126; Y04S 50/10
See application file for complete search history.

(56) References Cited

U.S. PATENT DOCUMENTS

| | | | | |
|---|---|---|---|---|
| 7,058,522 | B2 * | 6/2006 | Chen | H02J 3/00 706/15 |
| 7,092,798 | B2 * | 8/2006 | Mansingh | H02J 3/0012 702/57 |
| 7,321,810 | B2 * | 1/2008 | Mansingh | H02J 3/003 703/2 |
| 8,219,439 | B2 | 7/2012 | Iino et al. | |
| 8,712,595 | B2 * | 4/2014 | McMullin | B60L 53/14 700/297 |
| 9,048,684 | B2 | 6/2015 | Larson | |
| 9,077,204 | B2 | 7/2015 | More et al. | |
| 10,373,082 | B2 | 8/2019 | Henze et al. | |
| 10,566,792 | B2 | 2/2020 | Ellice-Flint et al. | |
| 10,901,445 | B2 | 1/2021 | Ellice-Flint et al. | |
| 11,689,018 | B2 * | 6/2023 | Ellice-Flint | H02J 3/38 705/37 |
| 2002/0091626 | A1 | 7/2002 | Johnson | |
| 2004/0094963 | A1 | 5/2004 | Johnson | |
| 2004/0215529 | A1 | 10/2004 | Foster | |
| 2004/0220869 | A1 | 11/2004 | Perera | |
| 2006/0167591 | A1 | 7/2006 | McNally | |
| 2008/0046387 | A1 | 2/2008 | Gopal et al. | |
| 2008/0262857 | A1 | 10/2008 | Perera | |
| 2010/0179704 | A1 | 7/2010 | Ozog | |
| 2010/0207452 | A1 | 8/2010 | Saab | |
| 2011/0046801 | A1 | 2/2011 | Imes et al. | |
| 2011/0202777 | A1 | 8/2011 | Hijazi et al. | |
| 2011/0204720 | A1 | 8/2011 | Ruiz | |
| 2011/0231028 | A1 | 9/2011 | Ozog | |
| 2012/0116847 | A1 | 5/2012 | Martorella | |
| 2012/0313604 | A1 | 12/2012 | Huda | |
| 2012/0323382 | A1 | 12/2012 | Kamel et al. | |
| 2013/0060391 | A1 | 3/2013 | Deshpande et al. | |
| 2013/0060720 | A1 | 3/2013 | Burke | |
| 2013/0082529 | A1 | 4/2013 | Wolter | |
| 2013/0090774 | A1 | 4/2013 | Kalich et al. | |
| 2013/0103378 | A1 | 4/2013 | Tinnakornsrisuphap et al. | |
| 2013/0144451 | A1 | 6/2013 | Kumar et al. | |
| 2014/0018969 | A1 | 1/2014 | Forbes, Jr. | |
| 2014/0148964 | A1 | 5/2014 | Gan et al. | |
| 2021/0141409 | A1 | 5/2021 | Ellice-Flint et al. | |

OTHER PUBLICATIONS

IEEE Standards Coordinating Committee 21 (IEEE); IEEE Standard for Interconnecting Distributed Resources with Electric Power Systems 2003 (IEEE 1547-2003); Rev. 2008; IEEE. (Year: 2008).

* cited by examiner

ELECTRICAL POWER CONTROL METHOD AND SYSTEM

CROSS-REFERENCE TO RELATED APPLICATIONS

This application is a continuation of U.S. patent application Ser. No. 16/792,580, filed Feb. 17, 2020, now U.S. Pat. No. 11,689,018, which is a continuation of U.S. Pat. No. 10,566,792, issued Feb. 18, 2020, which is the United States national phase of International Application No. PCT/AU2014/000605, filed Jun. 12, 2014, and claims priority to Australian Provisional Patent Application No. 2013902126, filed Jun. 12, 2013, whose contents are hereby incorporated by reference in their entireties.

TECHNICAL FIELD

The present invention relates to the supply of electrical power by an electrical power network. In a particular form, the present invention relates to controlling the transfer of electrical power between electrical networks.

BACKGROUND OF THE INVENTION

Electricity supply and pricing in a utility scale "smart grid" electrical network offers significant improvements in energy security, reliability, efficiency and lower cost to eventual end-users. In these systems, electrical generators using a variety of fuel types and having specific attributes related to the generator type compete to supply time dependent power blocks to the smart grid and offer reliable on-demand scheduling with guaranteed cost to supply. Generators participating in the smart grid receive higher utilisation and as a result improved operating efficiency. Several large scale smart grids world-wide have evolved that involve a central scheduling authority or market operator to manage and solve temporal demand solutions across large geographic areas in order to supply a number of specific demand regions within the larger geographic area. One example of such a smart grid electrical network is the national electricity market (NEM) in Australia as managed by the Australian Energy Market Operator (AEMO).

Demand forecasting is employed in smart grid electrical networks to predict temporal demand profiles across timescales of several minutes to weeks in advance. For any given forecast pattern of demand over time, there will be an associated optimal mix of generation and required network interconnections. Using accurate cost and scheduling models for the smart grid participants, namely the generators and transmission and distribution networks, a temporal "spot price" is evaluated against the demand profile forecast. Because generation of large scale electricity cannot be economically and efficiently stored or buffered within the electrical network, and also given the tendency for consumers towards continuous consumption, the electricity generators' output is required to match demand in real-time, i.e., instantaneously.

While hydroelectricity can be used to store excess energy from the grid it can only recover a small portion of this stored energy. For a smart grid spanning several distinct demand regions there exists the opportunity to trade surplus generated capacity or acquire additional capacity that was not originally accounted for in a given region's forecasted demand. This is a prime advantage of the network based energy supply model of smart grid electrical networks.

As referred to previously, Australia has implemented a fully integrated national smart grid, which is operated as an energy only, gross pool market, meaning that all energy is traded through a central clearing mechanism or market operator (i.e., the AEMO). A market clearing price is calculated by the market operator for each half hour trading interval based on the bids and offers of generators and retailers. A separate spot price is calculated in this way for each of the geographic regions of the NEM. In order for generators to sell energy into the wholesale market, generators submit offers to the AEMO detailing the volumes which can be generated and the prices for supplying. AEMO uses these offers to determine the most cost-effective way to meet the forecasted demand. The forecasted demand over a 24-hour look ahead is calculated and updated every half hour by the AEMO. Offers to generate electricity are then stacked in merit order of rising price with this merit order then used by the market operator to dispatch generators on a least cost first schedule.

The point on the merit order at which demand is satisfied determines a single price for electricity in each region of the NEM which is the Regional Reference Price (RRP). Generators within a NEM region then receive the RRP or spot price for the volume of generation for which they are dispatched. In general, the smart grid electrical network functioning as a supply and demand system tends to track regional demand extremely well with the settled temporal spot price or RRP at a given time (which is typically updated publically every 15 minutes) closely tracking the forecast RRP. It can be seen that spot price variations will reflect forecasted peak and off-peak demand patterns. While spot prices variations tend to follow an average pattern throughout most days of the year, at certain times they may also exhibit significant volatility reflecting, for example, seasonal/temperature fluctuations, outages and network interruptions.

Referring now to FIG. 1, there is shown a schematic representation of a smart grid electrical network 100 as described above. Electrical power is generated by generators 110 and transported to the end-user 130 via transmission and distribution networks 115/120 with the flow of monies then exchanged between the generator 110 and retailer 125 via the central clearing entity being the market operator 105. The end-user 130 interacts only with the retailer 125 for cost recovery. The end-user's 130 consumption is monitored via a measuring device (MD) (e.g., an electricity power meter) which is used by the retailer 125 to determine the amount of electrical power used and invoice the end-user 130. In this arrangement, the actual temporal wholesale spot price can vary considerably but this variation is not visible to the end-user 130 who will be paying a fixed or semi-fixed cost over a contracted time period.

A given retailer participating in the NEM representing a group of end-users 130 must therefore develop a risk based tariff schedule to reflect the cost of supplying electricity to a captive group of end-users 130 which is acceptable over the contracted time period which may be in the order of months or even years. The final retail cost (RC) presented to the end-user 130 by the retailer 125 comprises the anticipated purchase cost of electricity directly from the market operator 105 (WC), transmission network cost (TNC), distribution network cost (DNC) from the grid to the physical region of the end-user, end-user metering costs (MRC), retail operating costs (ROPC) (including, hedging future funds, market participation costs, credit notes for market purchases, customer billing and marketing) and retailer profit margin (RPM). Other costs such as government levies (GL) and environmental schemes (ESC) and feed-in tariff costs (FITC) are also passed through to the end-user 130.

The total retail cost RC then presented to the end-user is as a result RC=WC+TNC+DNC+MRC+ROPC+RPM+FITC+ESC+GL. Approximate proportions of the components comprising the RC are: WC=25%, TNC=26%, DNC=31%, (ROPC+RPM)=12%, FITC<0.5%, GL=1.5%, ESC=3%. This data is representative of the Australian 2012/2013 electricity cost breakdown and is not expected to vary substantially from other smart grid type networks in developed markets. As is evident from the above breakdown, total network costs constitute a major share (57%) of the total cost. The only time varying costs exposed to the retailer are WC and ROPC due to direct exposure to the electricity market. Network access costs are in general fixed over a period of several years. However, future market innovation will augment transmission network costs to be reflective of the actual power transferred between nodes comprising the transmission network and would be reflected in the market operator forecast.

The capital intensive nature of the electricity generation business means that it is not feasible to solely base the revenue streams around potentially volatile spot market prices. Equally, retailers 125 may be exposed to significantly high pool prices from time to time, which they must cover in order to supply their end-users 130. Accordingly, generation and retailer participants have developed a number of mechanisms to manage their exposure to this volatility, namely the use of futures contracts and/or vertically integrating generator with retail entities to form what are termed "gentailers".

Transmission and distribution networks further face pressure of providing increased network capacity to support the extremes of peak demand which occur for only small periods of the year. As an example, in Australia the maximum peak demand occurs for only 100 hours of the year, with 60% or more of the network capacity utilised for only 37% of the year. It follows that the network capacity utilisation (ratio of peak demand to average demand) for a majority of the time is therefore extremely poor.

To alleviate the need for increasing network capacity in order to meet the peak demand only, which as would be appreciated carries an extremely high capital cost penalty, there is a need to suppress peak demand events. As can be seen from above, networks costs (i.e., both DNC and TNC) are recovered by passing through a fixed cost to the end-user over a long time. Peak demand events are fundamentally constrained by the network node and transport link capacities. Therefore, large market anomalies can occur during these peak demand events generating extreme excursions in the spot price. This has been seen as a market failure of these types of smart grid market arrangements, i.e., the failure to reduce peak demand, leading to higher costs to the end-user 130 and also leading to power outages on those occasions where electrical power requirements cannot be met.

Yet a further market failure is the poor utilisation of renewable energy generation within the grid. As an example, wind energy is semi-dispatchable by the very nature of the wind source. Government policies generally mandate priority based use of renewable energy when available for supply to the smart grid electrical network. This is in preference even to dispatched fossil-fuel based generators scheduled to meet any demand event. For example, under these policies wind energy will displace fossil-fuel generation and as a result fossil-fuel generators then seek compensation from the market operator. Furthermore, wind generation capacity once available may exceed the required demand in their particular region and thus there is a need for this excess capacity to be used or dissipated and "lost" within the grid. These events typically do not occur during peak demand and thus the cost of electricity available in these circumstances is extremely low. In fact, a negative pricing event can occur if renewable energy cannot be shed.

In an attempt to better regulate end-user demand and as a result of improve the forecasting by the market operator, a range of flexible pricing offers have been made available by retailers such as time-of-use (TOU) tariffs as compared to block accumulation power tariffs. TOU is particularly advantageous for retailers and end-users alike in order to provide a time of day indicator for cost reflective pricing of electricity. The retail TOU pricing for end-user consumption is intended to reflect the relative levels of supply and demand at a particular time of day. In general, it is anticipated that cost reflective tariffs such as these will over the long term force end-user consumptions habits to reduce overall peak demand resulting in overall increased network utilisation and reduction in capital expenditure.

While TOU pricing is able to provide end-users with access to lower cost electricity the timing of this off-peak access is not generally compatible with the daily consumption profiles of end-users. As the TOU tariffs are set over a contracted period which is normally in the range of months to years, it can be seen that these tariff arrangements do not in the short term provide timely and accurate price signals required to stimulate a desirable response by end-users such as reducing peak demand. Furthermore, any reduced peak demand by an end-user is not at present reflected as a cost benefit signal to the electrical network for performing this action, e.g. by modifying tariff schedules or the like to induce or encourage further reductions of peak demand by an ends-user.

There is, therefore, a need to structure smart grid electrical networks to reduce peak demand events to improve network utilisation. There is also a need for a more effective and timely exchange of information between end-users and the smart grid electrical network to facilitate more efficient use of the network as a whole.

SUMMARY OF THE INVENTION

In a first aspect, the present invention accordingly provides a method for controlling the transfer of electrical power between a first electrical network and a second electrical network, comprising: receiving at the second electrical network pricing information from the first electrical network, the pricing information associated with the supply of electrical power between the first electrical network and the second electrical network; and modifying a demand characteristic of the second electrical network based on the pricing information.

In another form, the first electrical network is an electrically interconnected utility-scale grid under the control of a market operator comprising at least one power generation source and a transmission and/or distribution interconnection network operable to supply power to the first electrical network.

In another form, the pricing information is substantially real-time pricing information.

In another form, the pricing information includes the time dependent retail price forecast for the supply of electrical power by the first electrical network to the second electrical network.

In another form, the pricing information includes the time dependent demand forecast for the first electrical network.

In another form, the pricing information includes time-of-use (TOU) tariff data.

In another form, modifying a demand characteristic of the second electrical network includes generating in substantially real time forecast information characterising the future demand response of the second electrical network for provision to the first electrical network.

In another form, the forecast information includes a consumption cost forecast for the second electrical network.

In another form, the real time forecast information for the second electrical network is provided to the first electrical network.

In another form, modifying a demand characteristic includes modifying the electrical load requirements of on one or more electrical power consuming components or devices of the second electrical network.

In another form, the second electrical network includes an on-site electrical generating capability and wherein modifying a demand characteristic of the second electrical network includes any one of: isolating at least a portion of the second electrical network from the first electrical network and consuming electrical power generated on-site; or isolating at least a portion of the second electrical network and providing electrical power from the second electrical network to the first electrical network.

In another form, the on-site electrical generating capability is based on any one of: solar energy source for a photovoltaic generator; solar energy source for thermal generation of steam driven electromechanical generator; solar energy source for a thermoelectric generator; wind energy for an electromechanical generator; geothermal source for producing a steam driven electromechanical generator; landfill gas for combustion based generation of electricity; fossil fuel for combustion based generation of electricity; fossil fuel for electrochemical generation of electricity; thermal energy source for electromechanical generation of electricity; or any combination of the above.

In another form, the pricing information includes a time dependent feed-in tariff forecast for the supply of electrical power from the second electrical network to the first electrical network.

In another form, modifying a demand characteristic of the second electrical network includes supplying electrical power from the second electrical network to the first electrical network in accordance with the time dependent feed-in tariff forecast for the first electrical network.

In another form, the second electrical network includes on-site storage of electrical power and wherein modifying a demand characteristic of the second electrical network includes storing electricity supplied by the first electrical network.

In another form, the on-site storage of electrical power includes any one of: reversible hydrogen-oxygen fuel cells; fossil fuelled electrochemical fuel cells; electrolyte batteries; chemical batteries; electromechanical flywheels; compressible media to store energy which can be controllably released to impart rotational energy to drive conventional generation plants; or any combination of the above.

In another form, the method further comprises supplying the electricity stored by the second electrical network to the first electrical network.

In another form, modifying a demand characteristic of the second electrical network includes setting a threshold cost for power consumed in the second electrical network to generate a time dependent schedule to control the electrical consumption and supply characteristics of the second electrical network with respect to the first electrical network.

In another form, the pricing information is received either from: the market operator of the first electrical network; and/or a retailer responsible for the supply of the electrical power from the first electrical network to the second electrical network.

In another form, an additional fossil fuel network is operably connected to the second electrical network, and a fossil-fuelled generation plant is operably connected to the second electrical network, and wherein a time of use fossil fuel price taking forecast is provided to the second electrical network by either the fossil fuel network operator or a fossil fuel retailer.

In a second aspect, the present invention accordingly provides an electrical power switching system comprising: a first electrical network, the first electrical network providing forecast data including at least one of a time dependent electricity price forecast and/or time dependent electricity demand forecast relating to the supply of electricity from the first electrical network and/or a time dependent electricity feed-in tariff forecast relating to a price paid for electricity supplied to the first electrical network; a second electrical network operably connected to the first electrical network to allow electrical power to flow between the first electrical network and the second electrical network; at least one power measurement device for providing a real-time measurement of the flow of electrical power between the first and second electrical networks; a power flow modulation device operable to modulate the electrical power consumption between the first electrical network and at least a portion of the second electrical network; and a controller receiving as inputs the output of the at least one power measurement device and the forecast data from the first electrical network and operable to control the power flow modulation device with time dependent programmable events to modulate the transfer of electrical power between the first electrical network and the second electrical network based on the forecast data.

In another form, wherein the controller is configured to reduce the overall power consumption in the second electrical network based on a comparison between the second electrical network and first electrical network's power demand and/or a first electrical network's time-of-use (TOU) power pricing.

In another form, the system further comprises: an on-site power generation plant for the second electrical network controlled by the controller, the on-site power generation plant capable of supplying at least a portion of the second electrical network's power requirements, wherein the electrical power generated by the power generation plant is supplied by the controller to the first electrical network in accordance with the electricity feed-in tariff forecast.

In another form, the electrical power is supplied by the controller to the second electrical network during a first electrical network feed-in tariff pricing that is higher than the power generation plant's electricity generation cost.

In another form, the on-site power generation plant is fossil fuelled.

In another form, the system further comprises: an on-site power storage plant for the second electrical network controlled by the controller, the power storage plant capable of supplying at least a portion of the second electrical network's power requirements, wherein power is supplied to the power storage plant by the first electrical network during a low cost TOU pricing and wherein the power stored within the second electrical network storage device is then supplied to at least one of the first electrical network and/or the second electrical network by the controller when TOU pricing of the first electrical network is greater than the low cost TOU pricing when power was supplied to the power storage plant.

In another form, the controller is configured to estimate a forecast demand response within the second electrical network related to the TOU pricing forecast provided by the first electrical network, wherein the forecast demand response is optimised to reduce the power consumption costs incurred from the first electrical network.

In another form, the controller is configured to estimate a forecast demand response within the second electrical network related to the TOU pricing forecast provided by the first electrical network, wherein the forecast demand response is optimised to increase the power consumption cost incurred by the first electrical network for power supplied by the second electrical network to the first electrical network.

In a third aspect, the present invention accordingly provides a controller for controlling the electrical power interface between a first electrical network and a second electrical network, the controller configured to receive current and updated forecast pricing information relating to the cost of generation of electricity within the first electrical network for supply to the second electrical network, wherein the controller is further configured to perform a cost benefit analysis in real-time by comparing a demand forecast for the second electrical network against the current and updated forecast pricing information as supplied by the first electrical network.

In a fourth aspect, the present invention accordingly provides a controller for controlling the electrical power interface between a first electrical network and a second electrical network, the controller configured to receive current and updated forecast pricing information relating to the cost of generation of electricity within the first electrical network for supply to the second electrical network, wherein the controller is further configured to perform a cost benefit analysis in real-time by comparing a maximum allowable or threshold cost per time segment for the second electrical network against the current and updated forecast pricing information as supplied by the first electrical network.

In a fifth aspect, the present invention accordingly provides a controller for controlling the electrical power interface between a first electrical network and a second electrical network, the controller configured to receive current and updated forecast pricing information relating to the cost of generation of electricity within the first electrical network for supply to the second electrical network, wherein the controller is further configured to leverage consumption of low cost electricity by the second electrical network by choosing to fully or partially supplement electrical energy needs of the second electrical network by switching to on-site power generation and/or storage for the purpose of demand shifting to reduce peak consumption by the second electrical network.

In another form, the current and updated forecast pricing information includes a feed-in tariff forecast for the supply of electrical power to the first electrical network from the second electrical network and wherein the controller is configured to supply power to the first electrical network in accordance with the feed-in tariff forecast for compensation of the second electrical from the first electrical network.

In a sixth aspect, the present invention accordingly provides an electrical power control system for interfacing an end-user to a supply electrical network, the system including: at least one controller and an end-user load, the controller operable to receive pricing information relating to the time-of-use (TOU) price taking tariff and/or TOU feed-in tariff and or status of the supply electrical network; at least one of an on-site power generation plant and/or a power storage plant controlled by the controller that forms an end-user system configured to produce bi-directional electrical power transfer to and from the supply electrical network and the end-user; a power measurement device for recording flow data associated with time dependent electrical energy flows between the supply electrical network and the end-user load, wherein the data collected by the power measurement device is capable of being interrogated or queried remotely by both a supply electrical network retailer and the end-user, the power measurement device operable to store flow data over a predetermined time period; and at least one transfer switch controllable by the controller to control an external electrical device.

In another form, the supply electrical network includes a market operator to administer and manage the TOU price taking tariff specifically for the supply of electrical power consumed by the end-user system.

In another form, the controller receives pricing information from the market operator and controls the consumption and/or storage of electrical power supplied to the end-user system in accordance with the pricing information.

In another form, the controller receives pricing information from the market operator and controls the generation of electrical power by end-user system for supply to the supply electrical network in accordance with the pricing information.

In another form, the pricing information includes demand forecast information for the supply electrical network.

In another form, the controller is configured to estimate a demand forecast for the end-user system.

In another form, the pricing information is provided to the end-user by an electricity retailer.

In a seventh aspect, the present invention accordingly provides an electricity market system comprising: a plurality of electricity generators; a distribution network for distributing electricity generated by the plurality of electricity generators to a plurality of end-users or customers of the electricity market; at least one retailer for receiving monies from the plurality of end-users in satisfaction for the electricity supplied to an end-user; and a market operator for determining pricing information relating to the supply of electrical power, the pricing information including an updated forecast demand and a regional price for the wholesale cost of electricity as supplied by the plurality of generators, wherein the market includes a plurality of end-users operable to receive the pricing information in substantially real time from the market operator and/or the at least one retailer, the plurality of end-users determining whether to receive electricity from the electricity market based on a cost benefit analysis carried out by the end-user based on the pricing information.

In another form, the pricing information includes an updated feed-in tariff forecast and wherein the plurality of end-users have on-site electrical power generation and/or electrical storage capacity, the plurality of end-users determining whether to supply electricity to the electricity market based on a cost benefit analysis carried out by the end-user based on the feed-in tariff forecast.

In an eighth aspect, the present invention accordingly provides a method for controlling the transfer of electrical power between a first electrical network and a second electrical network, comprising: receiving at the second electrical network pricing information from the first electrical network, the pricing information associated with the supply of electrical power from a first electrical network to the second electrical network; receiving at the second electrical network pricing information from the first electrical network associated with the supply of electrical power from the second electrical network to the first electrical network; receiving at the second electrical network additional pricing information from a fossil-fuel network associated with the supply of fossil-fuel to the second electrical network from the fossil fuel network; and modifying a demand characteristic of the second electrical network based on the first electrical network pricing information and/or the additional pricing information from the fossil fuel network.

In another form, the pricing information and additional pricing information includes at least a 24 hour forecast with at least hourly resolution for the electricity forecast and at least daily pricing resolution for the fossil-fuel forecast.

In a ninth aspect, the present invention accordingly provides a method for controlling the time dependent transfer of electrical power by at least one generator interconnected within a first electrical network and the time dependent consumption of power by a second electrical network, comprising: receiving at the second electrical network pricing and supply information from the first electrical network relating to the forecast temporal power generation of a specific generation asset interconnected to the first electrical network, the pricing information associated with the forecast supply of electrical power between the first electrical network to the second electrical network; negotiating with the specific generation asset of the first electrical network for a purchase of the forecast electrical power for the relevant negotiated time period; and synchronising the second electrical network to the first electrical network for supply of electrical power for the relevant negotiated time period to the second electrical network.

In another form, the method further includes modifying a demand characteristic of the second electrical network based on the pricing information.

In another form, the specific generation asset is a renewable energy generation asset.

BRIEF DESCRIPTION OF THE DRAWINGS

Embodiments of the present invention will be discussed with reference to the accompanying drawings wherein.

In the following description, like reference characters designate like or corresponding parts throughout the figures.

DESCRIPTION OF THE INVENTION

Figure 2:
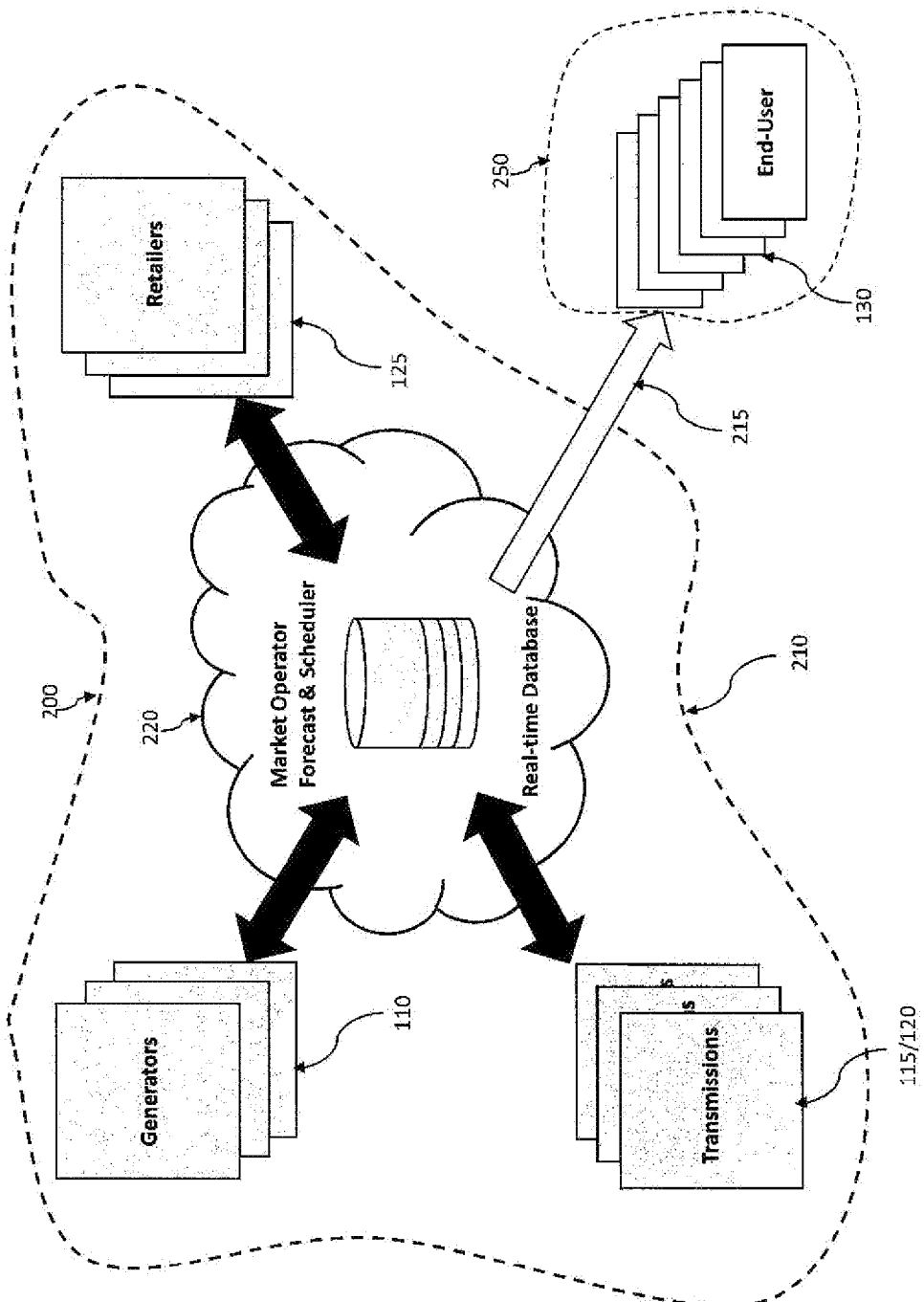
FIG. 2 is a schematic representation of an electricity market incorporating a first electrical network under the administration of a market operator supplying electrical power to a second electrical network in the form of an end-user in accordance with an illustrative embodiment.

Referring now to FIG. 2, there is shown a schematic representation of an electricity market 200 including a first electrical network 210, which in this illustrative embodiment is an electrical supply network or smart grid consisting of generators 110, a transmission/distribution network 115/120 and retailers 125 under the administration of a market operator 220 and a second electrical market 250 associated with an individual end-user 130. In accordance with this embodiment, a method for controlling the transfer of electrical power between a first electrical network 210 and a second electrical network 250 comprises receiving at the second electrical network 250 pricing information 215 from the first electrical network 210, the pricing information associated with the transfer of electrical power between the first electrical network 210 and the second electrical network 250 and then modifying a demand characteristic of the second electrical network 250 based on the pricing information 215.

In this illustrative embodiment, the first electrical market maintains a central database for synchronising and updating all market participants with pricing information. In this embodiment, market operator 220 provides pricing information 215 in the form of substantially real-time and forecasted demand and price signal information which is accessible to all electricity market participants including end-users 130. Pricing information 215 may be accessed or received via a publically accessible information network, dedicated telecommunications channel or via a wireless broadcast as required. In this illustrative embodiment, an internet web access portal is employed.

In another illustrative embodiment, the retailer 125 or energy supplier provides the end-user 130 with the pricing information 215 in the form of forecasted demand and price signal information (e.g., TOU tariff data) that can be optionally received via a publically accessible information network, dedicated telecommunications channel or via a wireless broadcast or retrieved from the first measurement device. As would be appreciated by those of ordinary skill in the art, the exact manner and method by which the second electrical network 250 receives the pricing information 215 is not critical to the operation of the system.

As described above, first electrical network 210 in this illustrative embodiment is an electrically interconnected utility-scale grid comprising at least one power generation source and a transmission and/or distribution interconnection network under the administration of a market operator 220 operable to supply power (i.e., a smart grid) to in this case local second electrical network 250 corresponding to an end-user 130. In other embodiments, the second electrical network 250 may be at an enterprise level or corresponding to a geographic area having its own local characteristics.

End-user 130 will access the first electrical network 210 by a physical connection point as is known in the art to supply electrical power to the second electrical network 250. In this illustrative embodiment, the second electrical network 250 includes a controller for the functional control of energy transfer between the first electrical network 210 and the second electrical network 250. The controller includes a first power measurement device capable of measuring the time dependent power consumed by the second electrical network 250 by sampling the actual power consumed at a known and absolute time. The measurement frequency within the first measurement device occurs at sufficient regularity such that the true power (i.e., real and or reactive power) that is consumed (or a representation thereof) within a time segment can be determined.

The power assigned to any one time segment as measured by the power measurement device is determined as the instantaneous power consumed, $P_i$. Further, the first measurement device is capable of allocating the instantaneous measurement of consumed power for a given time segment to a storage element which is further capable of storing a large number $N_i$ of instantaneous consumption power data linked to a specific absolute time segment $t_i$. The $N_i$ time dependent power data forms a first data set $DS=\{(t_{i=1}, P_{i=1}), \ldots, (t_{\_i=N\_}i, P_{\_i=N})\}$ which is held in at least one secure memory buffer such as in non-volatile memory that can be externally interrogated. The memory buffer can be intentionally fully or partially flushed to enable a second or sequential dataset to be stored as required.

In this illustrative embodiment, controller further comprises a control device which interfaces directly to the first measurement device to provide the time dependent power datasets as referred to above to the control device. Instantaneous power measured by the first measurement device can also be provided in real-time to the control device either asynchronously or synchronously.

The control device further comprises at least one electrically controllable switch or power flow-gate. The switch or power flow-gate performs the action of electrical connection or disconnection of at least a portion of the second electrical network 250 from the first electrical network 210. The power flow-gate can further augment the type of power available to the second electrical network 250. For example, a flow-gate may comprise a power controlling device capable of controlling the average power available to a load connected within the second electrical network 250.

In one illustrative embodiment, if the first electrical network 210 provides an alternating current then the flow-gate may comprise a phase-dependent triggered current pulse of width W that can provide a current pulse train at the line frequency so that the duty cycle pulse limits the maximum power that is available to at least a portion of the second electrical network 250. This function can be provided by electrical flow-gate type devices based on switch-mode power management technologies provided by thyristors and insulated gate bipolar transistors (IGBTs) and high power III-N transistors (e.g. wide band gap semiconductor switching devices such as Silicon, Silicon Carbide and Gallium Nitride transistors or high electron mobility transistors (HEMTs)).

In this illustrative embodiment, the control device comprises at least one controllable communications port that can send a signal to alter the mode of operation of a power consuming device. For example, a digital signal can be sent remotely to a power consuming appliance that is enabled to act upon the signal and alter the mode of operation and as a result the power consumption level of the appliance.

The control device may further comprise a computational module, a data storage module (internal or external database or internet network accessed storage) and a communication module. The communication module comprising at least one of a radio frequency transceiver, a data communications port, a wireless communications port, or an internet access point. The control device may also have analogue and digital input and output modules to enable signals and telemetry to be input and output into the computational module. The control device may also have an interactive display which can provide a user with information and enable data entry.

At a functional level, the controller is configured to provide an end-user with actionable information to perform a task and or to provide autonomous actions for modifying a demand characteristic of the second electrical network such as the demand response. In another illustrative embodiment, modifying a demand characteristic of the second electrical network may involve transferring or supplying electrical power from the second electrical network to the first electrical network. In another illustrative embodiment, modifying a demand characteristic of the second electrical network may include storing electrical power provided by the first electrical network at predetermined times for later use or for transfer back to the first electrical network.

Generally, the aim of modifying a demand characteristic of the second electrical network is with the aim of reducing the cost of electrical power consumed by the second electrical network and further to reduce peak demand events.

Figure 3:
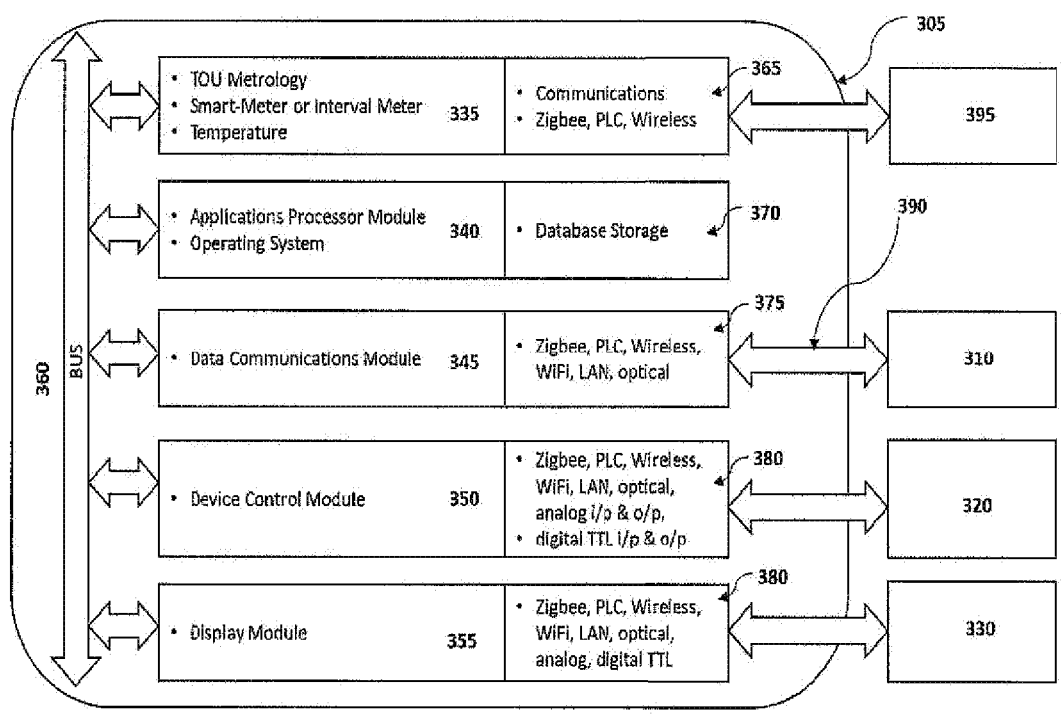
FIG. 3 is a functional block diagram of a controller for interfacing with a first electrical network for modifying or controlling the demand response of a second electrical network in accordance with an illustrative embodiment.

Referring now to FIG. 3, there is shown the functional blocks necessary of a purpose built control device 305 according to an illustrative embodiment. Control device 305 comprises a metrology module 335, application processor module 340, including internal database storage 370, data communications module 345, data storage module 370, device control module 350 and a display module 355, with all modules interconnected by a common internal communication bus 360. A variety of external communications protocols are supported 365, 375 & 380 for control and or transferring data to external modules via a communication channel 390 to external sensors 395 (e.g., power measurement device, and temperature), control devices 320 and external databases 310. While in this embodiment the control device 305 is purpose built, in other embodiments the controller functionality may be made up of numerous components. In yet another embodiment, the controller may include a personal computer or tablet device 330 adapted with further interface components to provide the required functionality.

Control device 305 is capable of executing the various electrical power management strategies that are set out in the following description, including connecting to an external information network and transferring bi-directional data, performing complex data manipulation for the power management strategies, providing analogue-to-digital sampling to sense real-time signals and to provide control channels for remote sensors, actuators, power control elements and indicators. Control device 305 can operate autonomously and provide interactive functions to an end-user and or external network query.

Figure 4:
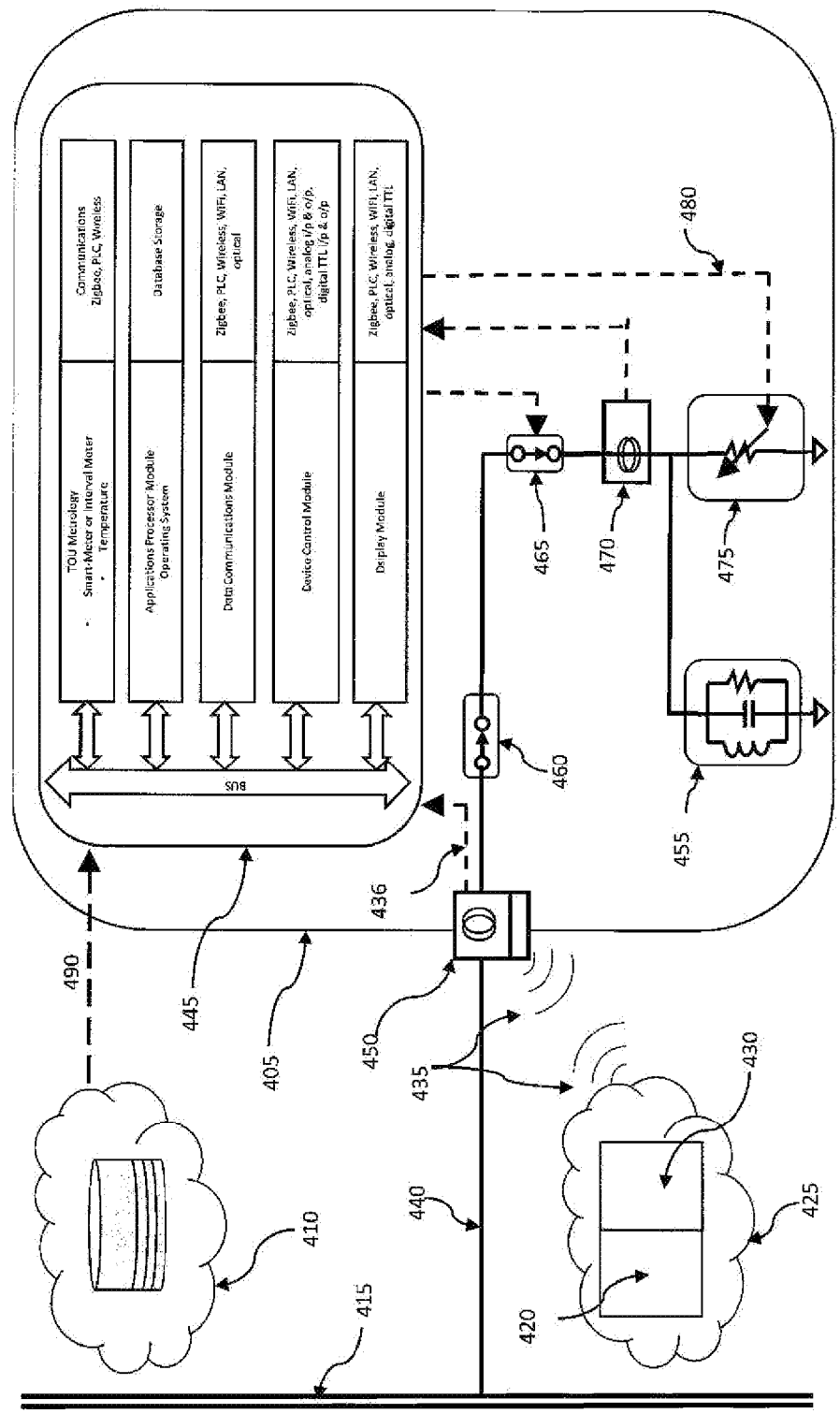
FIG. 4 is a schematic representation of a hardware configuration in accordance with an illustrative embodiment including the controller of the type illustrated in FIG. 3 interfacing between a first electrical network (e.g. a smart grid) and a second electrical network (e.g. an end-user) for modifying or controlling real-time demand response at an end-users site.

Referring now to FIG. 4, there is shown a hardware configuration according to an illustrative embodiment of the present invention. A smart-grid control device 445 of the type illustrated in FIG. 3 is embedded within a second electrical network 405 physically connected to a first electrical network 415 via electrical connection 440. A first power measuring device 450 which is capable of metering the time-of-use consumption by the second electrical network further includes data communication channels 435 and 436 as indicated.

The power measuring device or meter 450 communicates with a meter data aggregator 430 that manages the end-user consumption data. The communication channel for the meter 450 to data aggregator 430 may be via wireless or power line transmission (PLT) protocols. The TOU meter 450 may be provided by a retailer 425 or by an approved 3rd party meter data provider 420 or by the end-user 130 and provides tamper-proof contestable and secure data source for the first power measurement device 450.

The meter 450 may be an interval meter or a smart meter with wireless or PLT communication 435. The meter further is capable of performing high resolution power measurement of at least 1 Watt·hour (Wh), and storage of a time segment to resolution of 10-100 Wh. The minimum time interval segment logged by the meter 450 in this illustrative embodiment is t=30 min. A second power measurement device 470 may be installed by the end-user to provide additional higher resolution metering (e.g., power monitoring on 10 second to 5 minute interval) for the control device 445 if desired. The control device 445 communicates with the first measurement device or meter 450 via communication link 436 which may be any standard wired or wireless protocol, Zigbee, PLT or the like. Pricing information in the form of real-time and historical smart-grid information is received from the market operator by accessing central database 410 which may be accessed via link 490 which in this illustrative embodiment is an internet web portal.

FIG. 4 further depicts a circuit breaker 460 and a controllable contactor or switch 465 as well as two second electrical network load types 455 & 475. Load 455 is a reactive passive load whereas variable load 475 can be controlled in its real or reactive magnitude by control signal 480. The system described above is accordingly capable of accessing real-time and forecast first electrical network time-dependent regional pricing and demand. The measuring device 450 optionally may provide retail tariff information by virtue of duplex communication link 435. Based on these data, the second electrical network can be managed by implementing control methodologies as will be described herein to advantageously control end-user cost using price reflective information from the first electrical network.

Figure 1:
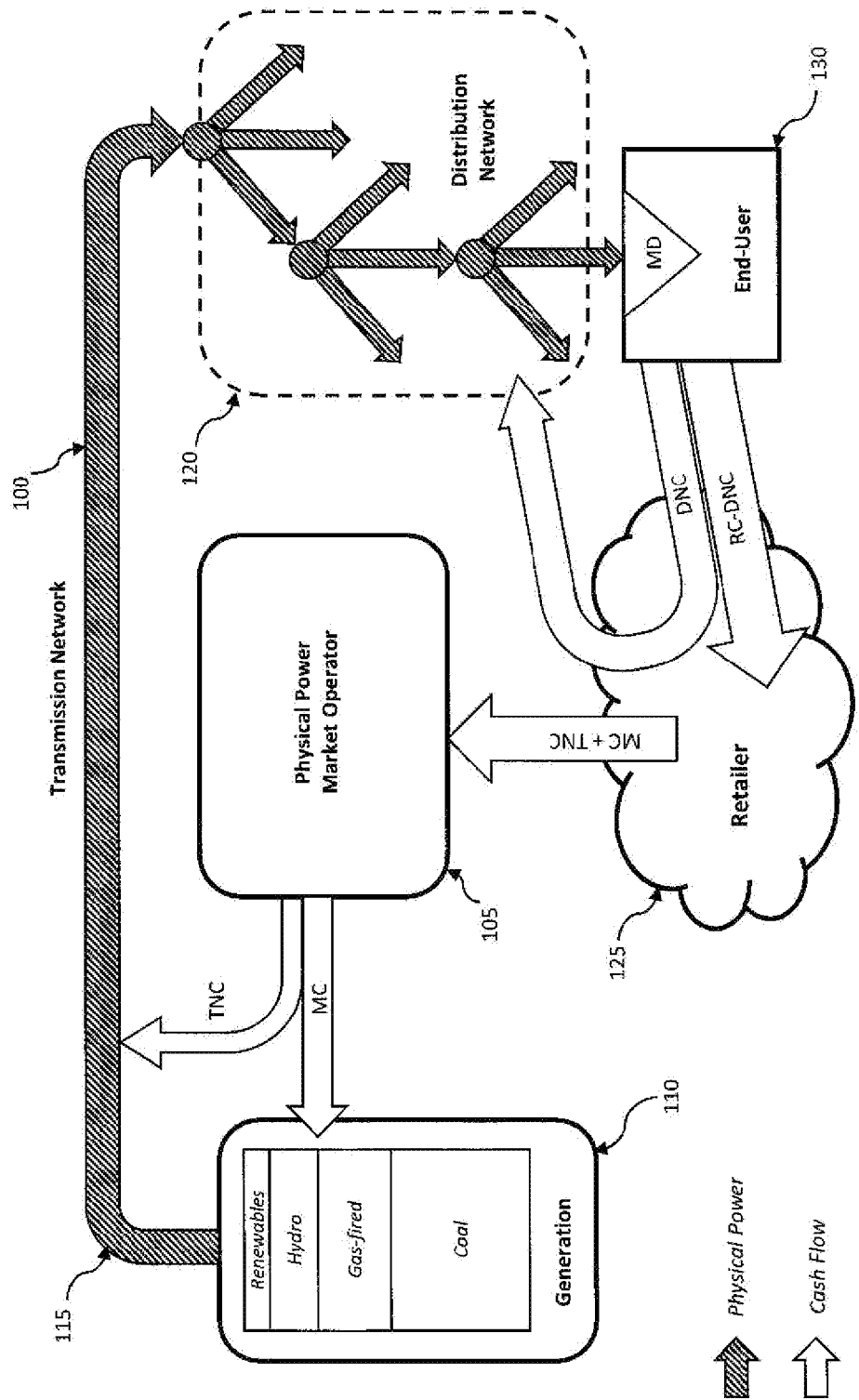
FIG. 1 is a schematic representation of a smart grid under the administration of a market operator comprising a first electrical network for supplying electricity to an end-user.

In another embodiment, retailer 425 provides and transmits real-time TOU information which is also received by the second electrical network control device 445 via communication channels 435 or 490. In this case, the retailer 425 provides access to database 410 providing first electrical network cost forecast 410. The modified cost forecast over a regional wholesale cost forecast may include all additional charges the retailer is required to provide services to the end-user second electrical network 405. By referring to the first electrical network operational structure generalised in FIG. 1, the retailer 425 bases all decisions on the forecasted whole sale spot price of the first electrical network, past settlements in the whole sale market, credit responsibilities to fulfil service and profit margin goals.

As a result of the second electrical network being capable of receiving pricing information and being able to modify its demand characteristics accordingly, both the retailer and the end-user may seek advantageous reductions in the cost of supply and the cost of consumption respectively given the access to pricing information that is provided dynamically and in various embodiments may be in real-time or in substantially real-time reflecting the variations in the spot price and the demand forecast. This may be compared with current supply arrangements where a retailer provides block TOU pricing that is fixed over a substantial long term period, for example 3 months, and then subsequently revised.

Fixing such a long term retail TOU tariff must therefore reflect and account for a high level of risk. The retailer is dependent upon smart-grid forecast and securities obtained via hedging, futures contracts and forward looking direct agreements with generators to manage costs. Unfortunately, the actual instantaneous demand and reliability is also dynamic and these costs cannot be accurately known by the very nature and represent a risk. This is to be compared with present methods and systems involving where a faster and smaller time segment resolved TOU pricing forecast is provided by the retailer to the end-user.

Figure 5:
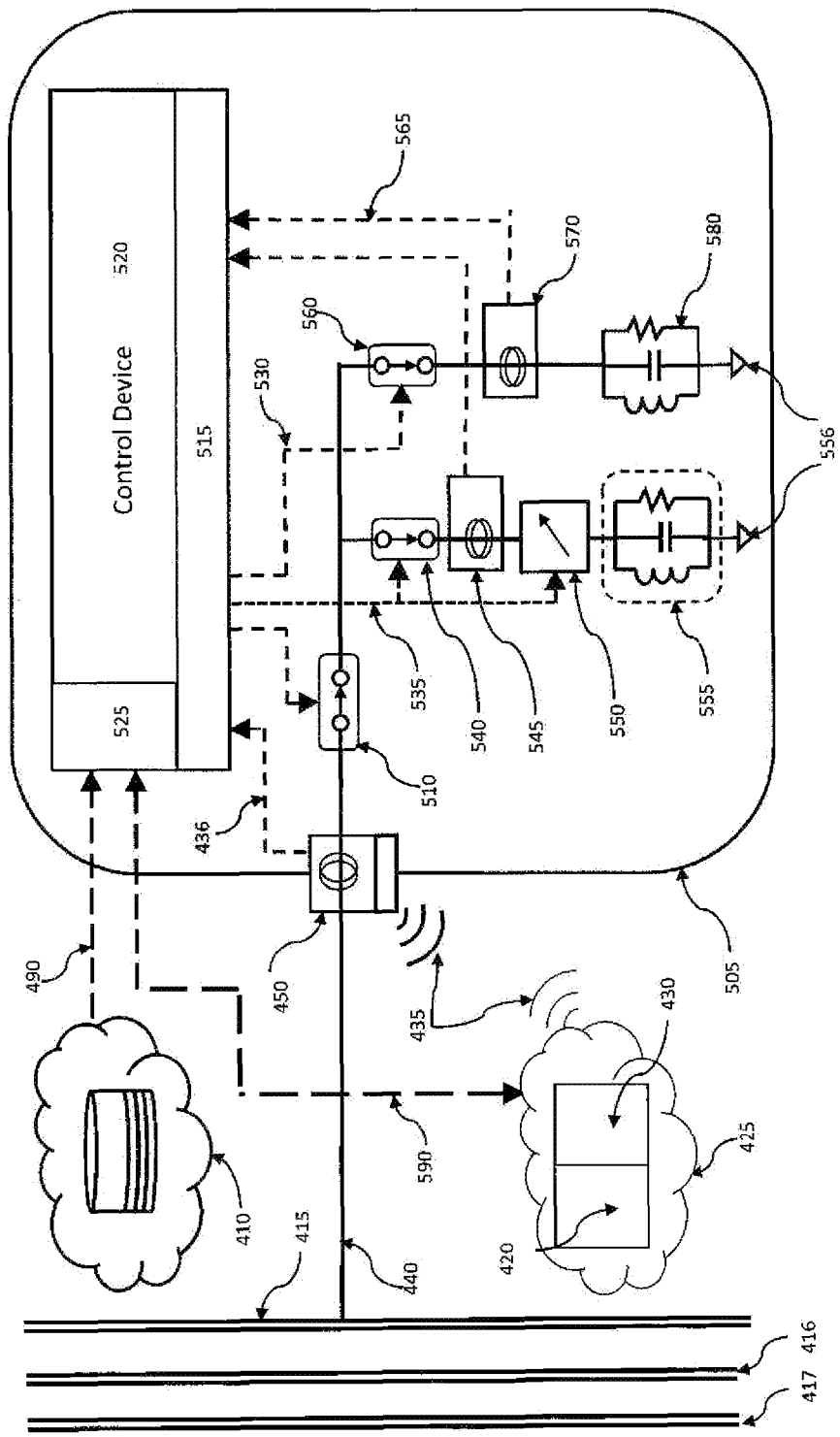
FIG. 5 is a schematic representation of a hardware configuration similar to that illustrated in FIG. 4 including a power flow-gate device used to proportion power to a passive load.

Referring now to FIG. 5, there is shown a further illustrative embodiment of the present invention, where the second electrical network 505 comprises a power flow-gate 550 that can manage the power consumption of a passive reactive load 555. Second and third power measuring devices 545 & 570 meter real-time information to the control device 520 via control module 515. A controllable series connected transfer switch or smart transfer switch 540 & 560 enables binary operation of the power flow.

The hardware configuration depicted in FIG. 5 illustrates an embodiment of the present invention involving a single-phase alternating current (AC) first electrical network supply and response. As would be appreciated by those of ordinary skill in the art, the control arrangement may be extended to multi-phase power network (namely, three phase 3 φ comprising first electrical network electrical active supply 415, 416 & 417). For 3φ operation there would be a plurality of control elements, for example, a measurement device 450 capable of metering TOU usage across three independent phases, a plurality of programmable switches 510, 540 560, a plurality of second electrical network power measuring devices 570 & 540. The three phases would service three separate circuits comprising the second electrical network, with three loads of the form of at least one of 555 and 580. At least one control device 520, 525 and 515 is required to manage the three phase second electrical network. Intrinsically understood is the completion of the power flow within the second electrical network to neutral or ground connections 556 as required. Control lines 530 and 535 may be hard wired or wireless communication links. Similarly, sensors (for example 570) may transmit information to the control device interface 515 via an electrical or wireless link 565. Sensor and control lines may also support bidirectional communications as required.

A. Modes of Operation

As discussed previously, the controller may be configured to perform in any one of at least four (4) distinct modes of operation. By way of example and not being limited to, four cases are exemplified.

Mode 1: Cost Capping Mode

In an illustrative embodiment, the controller of the present invention may be configured to provide functions including, but not limited to:

(1) Dynamically controlling power exchange and flow from a first electrical network to a second electrical network via the use of electronic controllable transfer switches and or flow-gates and or providing signals to controllable power devices connected to the second electrical network to alter the power consumption operating modes (e.g., standby, full power mode, partial power mode).

(2) Receiving, accessing or regularly acquiring and updating a digital representation of a valid first electrical network time dependent regional retail price forecast RRP(t) (which may be based on the market operator regional price forecast or provided directly by the retailer) and/or a regional demand forecast RDF(t).

(3) Receiving, accessing or regularly acquiring a first electrical network electrical operator tariff for time-of-use supply to the end-user.

(4) Inputting a maximum cost per unit of power acceptable by the end-user site (CM) [e.g., in units of $/kWh] and thereby using CM to actively compare against the latest valid forecasted cost schedule of the first electrical network RRP(t).

(5) Generating and implementing a decision matrix for actionable time sequenced events to perform within the second electrical network to cap and/or manage instantaneous power consumption.

(6) Allowing the end-user to optionally input or automatically acquire into the control device a digital representation of the TOU profile for each of the affected power consuming devices on the second electrical network.

(7) Displaying and/or providing the end-user with the decision matrix. The decision matrix optionally showing the second electrical network devices to be affected and or actions to be taken.

(8) Calculating the accumulated second electrical network cost, the real time cost consumed by the second electrical network, and the forecast cost avoided by using CM.

(9) Acquiring, updating and storing a second electrical network time-dependent load profile L(t), the local temperature and other optional signal that determine end-user consumption habits (e.g. a time-dependent signal whether a room or dwelling is occupied).

(10) Enabling remote access to the input parameters of the control device, and remote access for monitoring the control device performance, such as, the accumulated second electrical network cost, the real time cost consumed by the second electrical network, the forecast cost avoided by using CM and the time-dependent load-profile.

(11) Implementing methodologies according to the embodiments described herein using the first electrical network forecasting data to advantageously reduce at least one of total cost or demand to the end-user.

Figure 7:
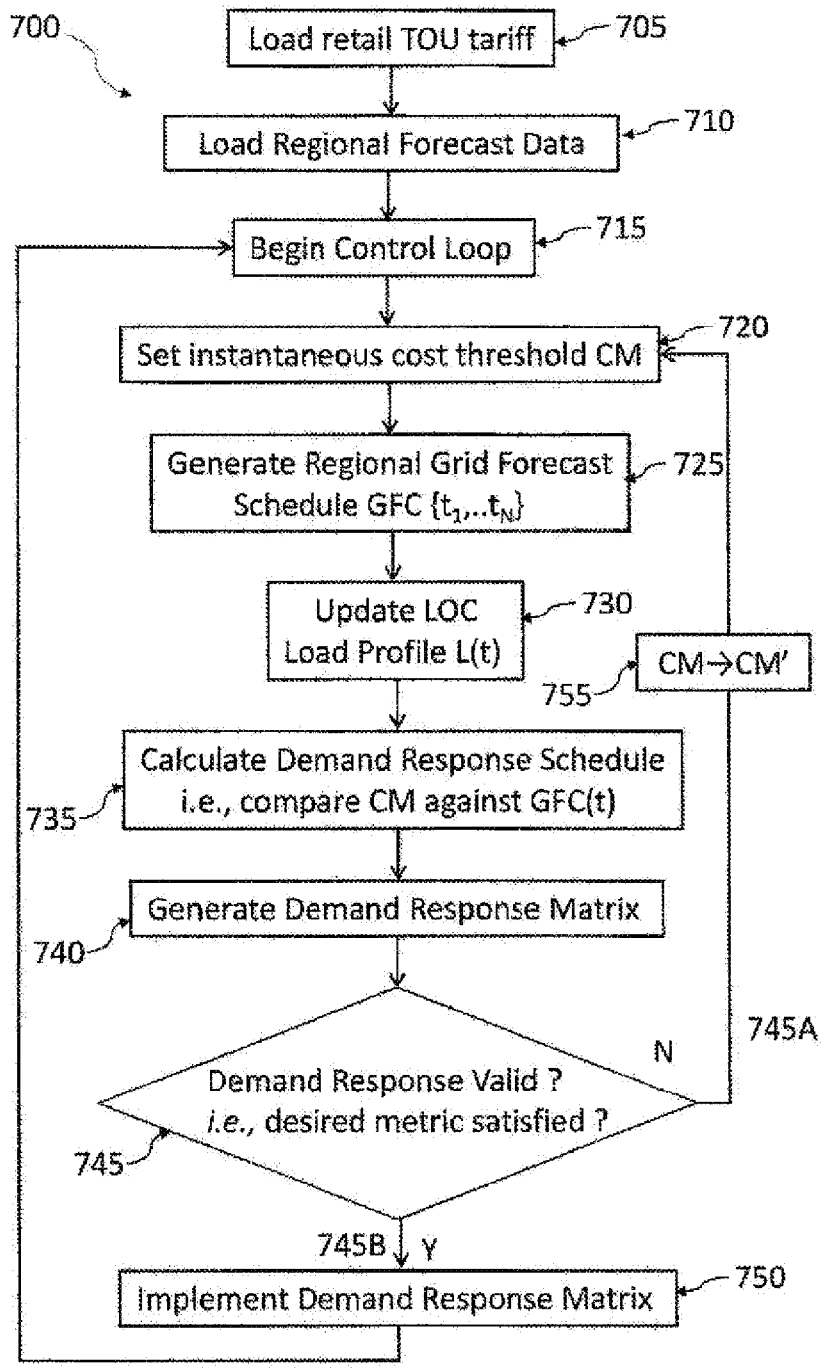
FIG. 7 is a process flow diagram of a cost levelling method employed to create a demand response in the second electrical network to control expenditure within the second electrical network.

Referring now to FIG. 7, there is shown a process flow diagram of a cost levelling method 700 which enables the end-user site to optimise the actual CM chosen against work performed within the second electrical network. To fully describe the process performed by the control device an actual example is detailed.

Figure 6:
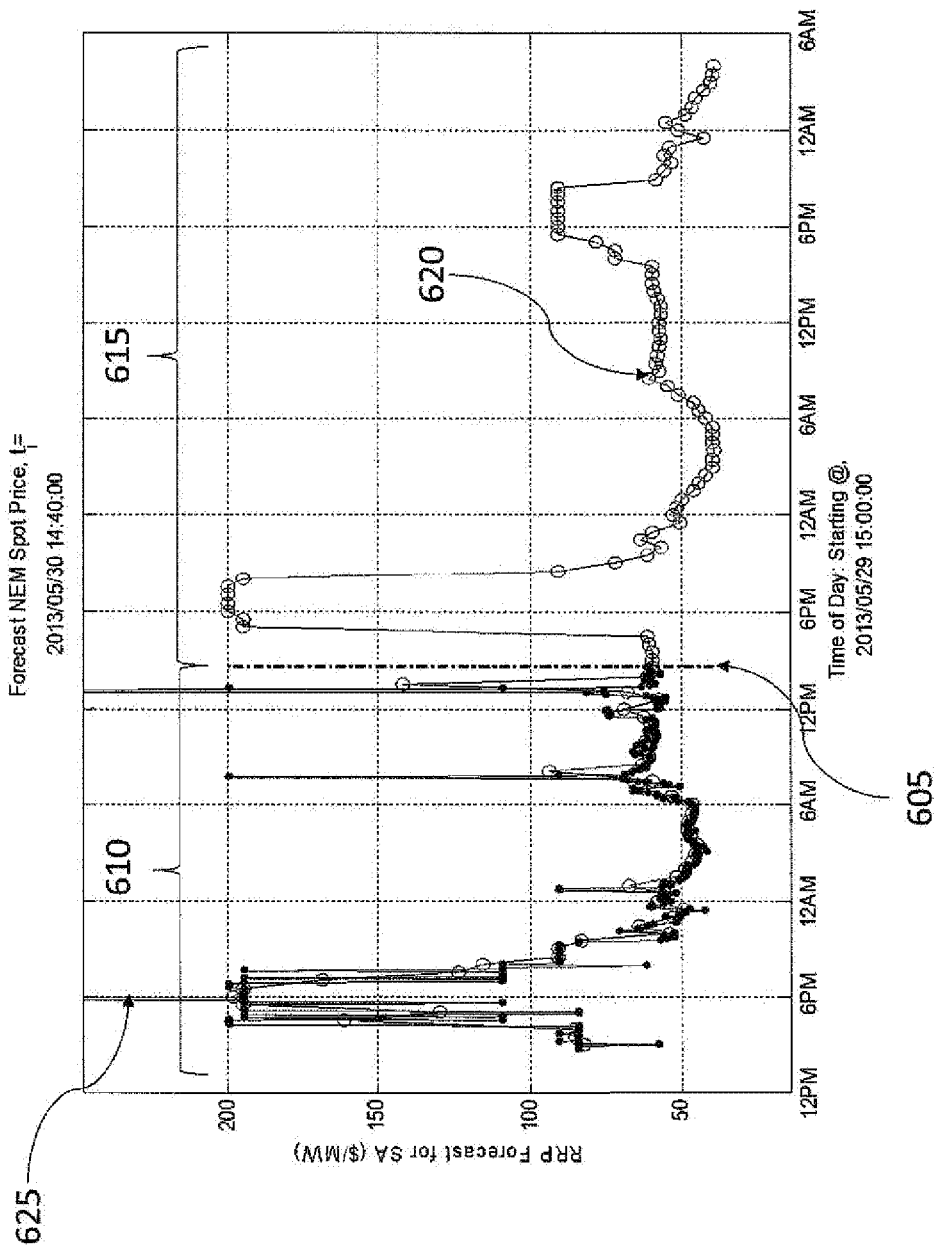
FIG. 6 is a graph of actual historical data and forecast RRP(t) data acquired by a controller of the type illustrated in FIG. 3 from the market operator of the first electrical network.

Referring now to FIG. 6, there is shown a graph of pricing information provided by the smart-grid (i.e., first electrical network) in the form of historical (610) and forecast (615) RRP data which is received by the end-user and stored locally within the application processor of the controller.

As can be seen in FIG. 6, historical RRP data 625 for settled regional market prices is plotted as closed circles while the forecasted RRP 620 is plotted as the open circles. The dashed vertical line 605 indicates the current and present sample available to the control device and is also the current 5 min time segment. To the right of the dashed line is pure RRP forecast against which the control device bases a decision for action. Once the forecast day-ahead first electrical network data and TOU tariff data is available the cost levelling method 700 of FIG. 7 is initiated where at step 705 the retail TOU tariff data is loaded as well as the regional forecast data at step 710 at which point the control loop may be implemented at step 715.

At step 720, an end-user threshold cost CM is set which reflects the maximum price or risk exposure the end-user is willing to accept. In this illustrative embodiment, and as depicted in FIG. 6, the forecast data 620 is supplied in 5 to 30 min time segments and the historical settled market price 625 is provided with 5 min or less resolution. At step 725, the regional grid forecast schedule (GFC) over time increments $t_1$ to $t_N$ is generated. In this example, the GFC is an actionable event register over the forecast time window flagging decision events for the second network with respect to the RRP based on the current value of CM. For example, the GFC register flags if at a given time period in the first electrical network forecast it is favourable for the end-user to consume electricity from the first electrical network or provide a price taking decision. As such, the GFC functions to provide a forecast price time series setting out control events for the electrical network. At step 730 the local (LOC) load profile L(t) as a function of time is also updated.

At step 735, a comparison is carried out between CM and the entire forecast price time series GFC, for example over 24 hours, to generate a demand response matrix/register at step 740. For all time values corresponding to where RRP (t)>CM a demand response is required. An assessment of the demand response matrix for a given CM is carried out at step 745. If the desired outcome is acceptable then the loop proceeds 745B to the next step and the demand response matrix is implemented at step 750. Otherwise 745A the CM is augmented at step 755 to optimise the desired response.

A desired response for example, is based on the cost avoided (i.e., compared to 100% pass through). The maximum and minimum RRP limits are compared to the previous days and weeks average RRP. If both the current forecast minimum {RRP(t)} and maximum{RRP(t)} exceed the average {RRP(t)} then the threshold cost CM is incremented upward.

It is understood more complex methodologies optimising the outcomes to the end-user are also possible. Here the primary concept is the comparison of an end-user figure of merit against a first electrical network forecast provided by the market operator or retailer for the express purpose of providing reflective and accurate time-dependent price and demand. This uniquely enables the end-user to provide the highest level of demand response within the second electrical network.

Figure 8:
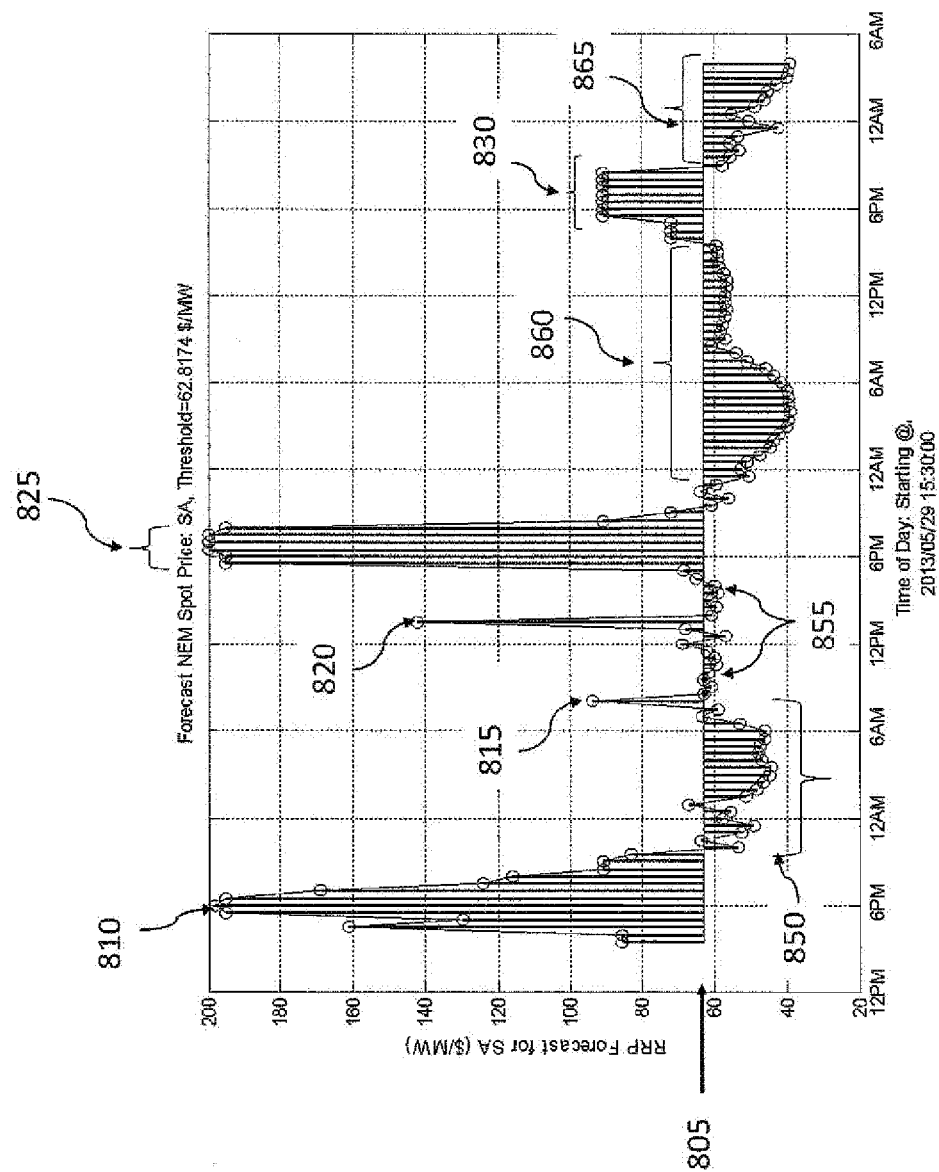
FIG. 8 is a graph of the cost avoided within the second electrical network (for example regions labelled 810, 815, 820, 825 & 830) by rejecting power flow into the second electrical network from the first electrical network by setting a cost threshold CM.
Figure 12:
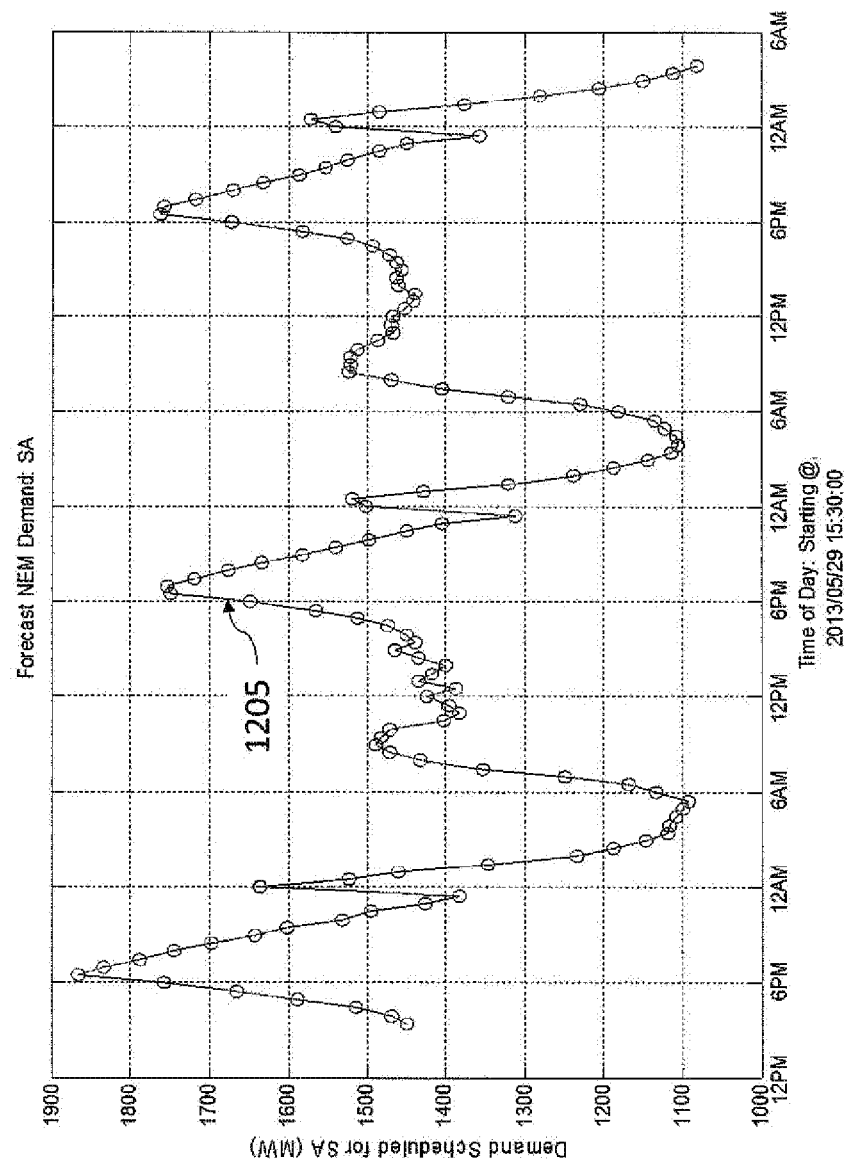
FIG. 12 is a graph of the first electrical network demand forecast for the examples referred to in FIGS. 8 to 11.

Referring now to FIG. 8, there is shown an example of a valid day look ahead time-dependent price forecast for a specific region of the electricity market that is applicable to the end-user. In this example, the CM threshold is set to CM=62.8174 $/MWh and provides the decision engine with a scheduled demand response within the second electrical network. Areas with vertical lines above threshold amount 805 indicate a demand response is required within the second electrical network and the vertical lines below threshold amount 805 indicate where no demand response is necessary. This one-dimensional array of time-dependent actions forms part of the decision matrix of the controller. Note, the average previous daily regional cost of electricity in this example was 69.72 $/MWhr. Clearly, the peak excursions for the forward looking forecast exceed this by a substantial amount and are indicative of the first electrical network peak demand pricing events (see also FIG. 12).

FIG. 8 is accordingly a graph of the cost avoided within the second electrical network (for example regions labelled 810, 815, 820, 825 & 830) by rejecting power flow into the second electrical network from the first electrical network by setting a threshold cost 805 as a result of creating a demand response schedule applied to the first electrical network forecasted price. Power is consumed from the first electrical network into the second electrical network in regions labelled 850, 855, 860 & 865.

Figure 9:
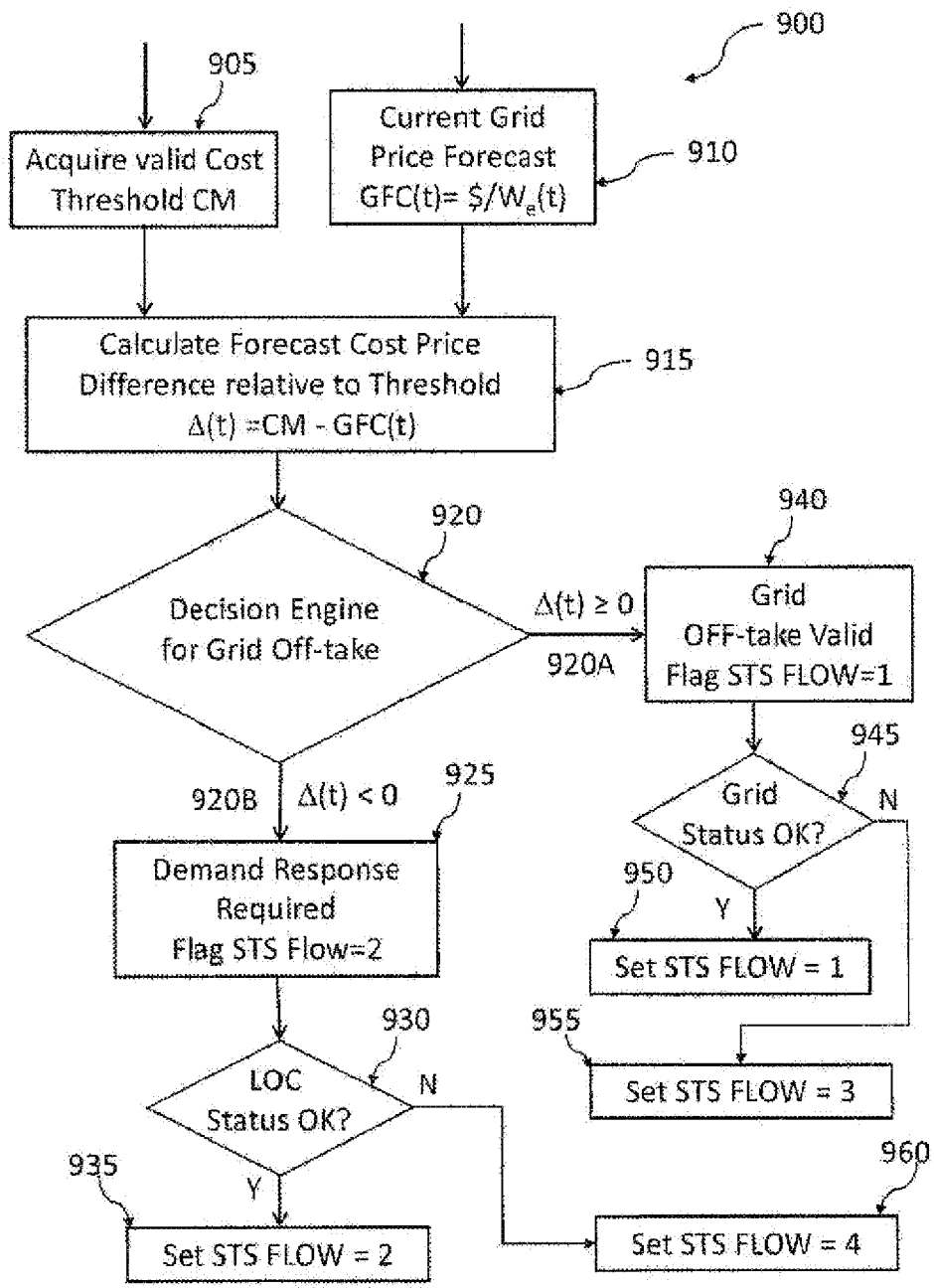
FIG. 9 is a flowchart of the decision engine functionality for comparing the first electrical network price forecast with a threshold cost within the second electrical network. If the 30 min segment exceeds the CM threshold then a demand response is required.

FIG. 9 shows a process flowchart 900 containing further detail within the decision engine used to create a demand response by comparing the first electrical network price forecast with a desired end-user cost threshold. At step 905 the end-user cost threshold CM for price-taking is acquired. The CM can be altered based as a function of time or on priority for service at the end-user site. Step 910 provides a first electrical network price forecast which is then compared directly to CM at step 915. The decision engine 920 then directs actions based on the sign of the cost difference □(t). If the □(t) calculated in any one time segment of the forecast is greater or equal to zero (event 920A) then an event register is flagged allowing advantageous price-taking for consumption of electricity from the first electrical network. For example, CM may be modified at the end user site for the second electrical network at any time or based on peak and off-peak periods during a 24 hour cycle. During low first electrical network pricing events, the second electrical network may select for on-site storage/charging or advantageous low cost consumption within the second electrical network.

Step 940 flags the available devices or sub networks for consumption from the first electrical network. For example, smart transfer switches (STSs) are enable to a flow state FLOW=1 symbolising a valid status for flow of energy from a first electrical network into the devices and sub networks comprising the second electrical network. Optionally, at step 945 the status of the first electrical network is interrogated. On returning a valid status the flow state is set in step 950. Otherwise, if the first electrical network is not available the network is configured appropriately. As an example, even if price taking may be advantageous from the first electrical network, there may exist a local disruption to the first electrical network supply to the end-user site or second electrical and thus on-site power generation or on-site storage is potentially accessed (indicated as FLOW=3 in FIG. 9 where internal power is consumed). If, however, □(t)<0

(event 920B) then CM is exceeded and an event flag is set to indicate disadvantageous price taking from the first electrical network.

At Step 925 the demand response provided in the second electrical network is determined. Smart transfer switch (STS) or a plurality of demand response event registers can be allocated to available device or sub networks within the second network. A STS Flow status of FLOW=2 indicates a reduction of consumption from the first electrical network. For example, STS FLOW=2 may enable the turning off or modulation in the power consumption of high demand devices in the second network. If on-site and on-demand power generation or stored energy is available then it is preferentially consumed within the first electrical network.

Figure 10:
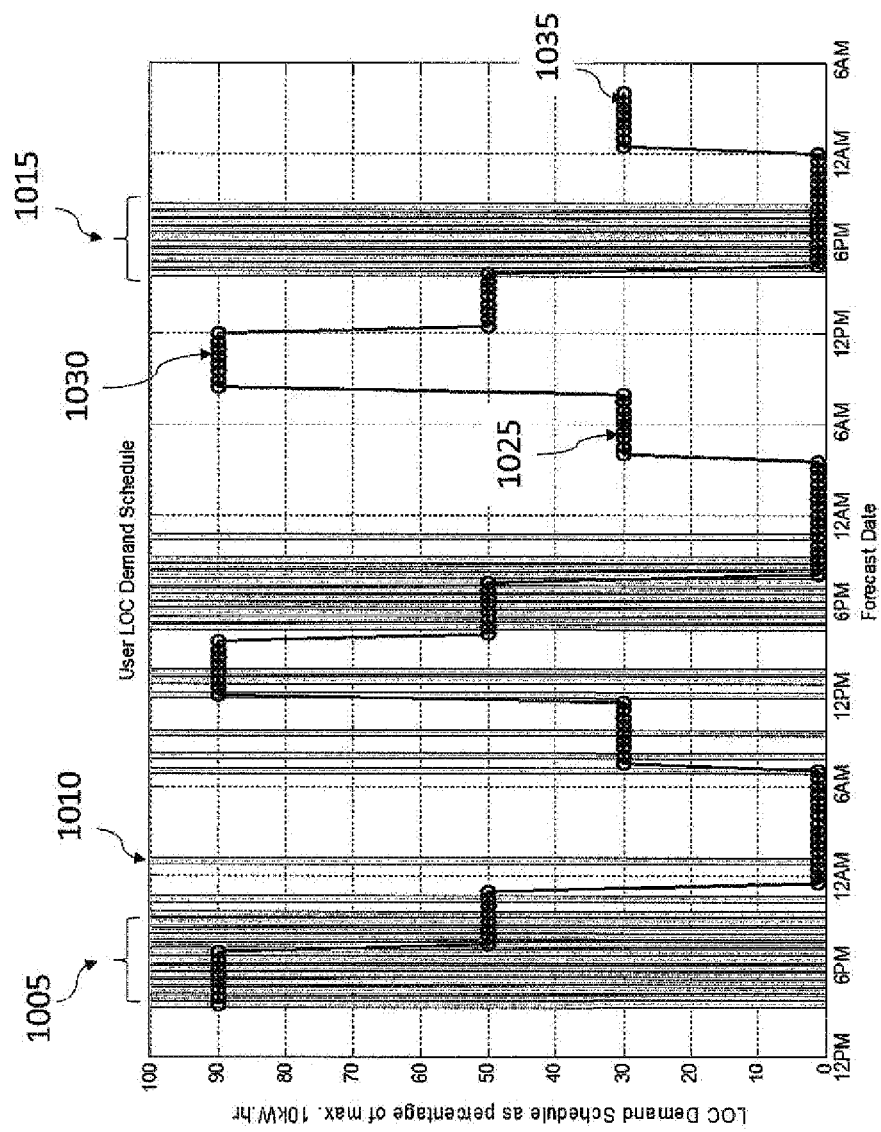
FIG. 10 is a graph depicting the demand response events within the second electrical network initiated by a controller of the type illustrated in FIG. 3 where the end-user load forecast (for example, load points 1025, 1030 & 1035) is superimposed showing the impact of the demand responses.

Optionally, step 930 ensures the local devices and network are available through interrogation of valid status registers set by each of the available devices and networks. Then at step 935 the demand response is implemented, for example, by setting the smart transfer switches to STS FLOW=2. If on-site electricity generation is available, an event register can be flagged to supply electricity from the second electrical network to the first electrical network based further on the feed-in tariff if available. If the local on-site power is not available then STS FLOW=2 is set, for example, indicating the decoupling of power consuming devices in the second electrical network. FIG. 10 shows how the demand response impacts the end-users load profile. The open circles map a forecasted end-user load profile across a period of approximately 48 hours (for example, load points 1025, 1030 & 1035). The vertical bars indicate where a demand response is required within the second electrical network (for example regions labelled as 1005, 1010, 1015) by modulating power flow into the second electrical network from the first electrical network as initiated by the control device.

Figure 11:
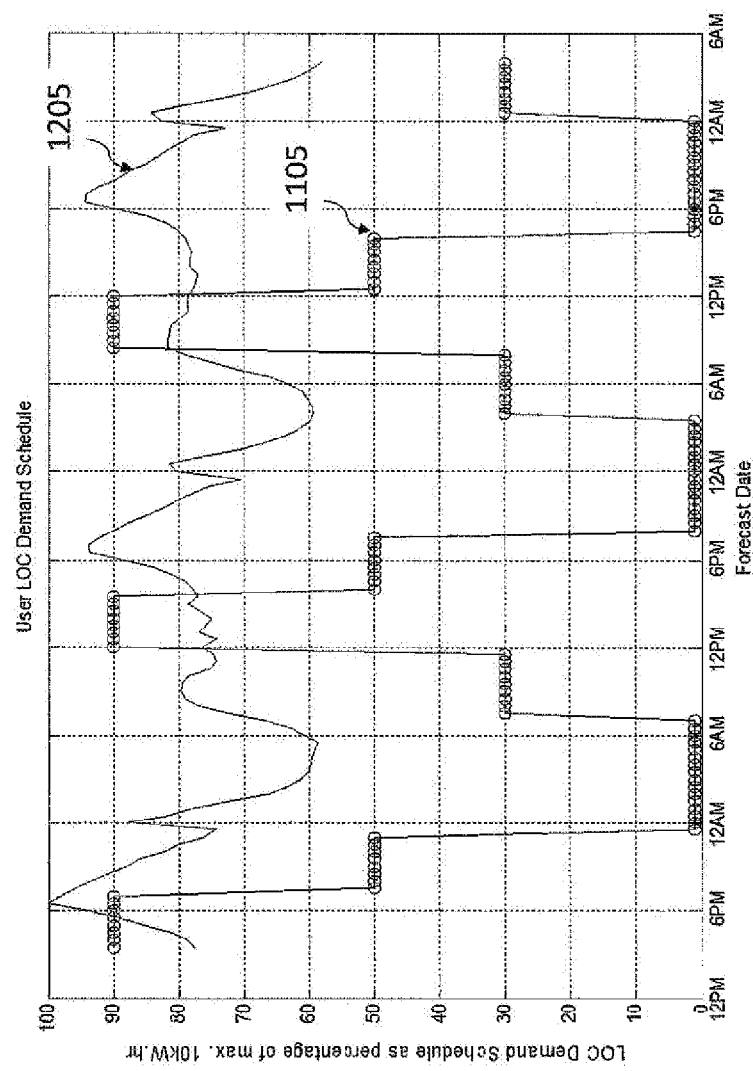
FIG. 11 is a graph of a comparison between the end-user load profile forecast relative to the regional supply network demand forecast over a 48 hour period. First electrical network demand forecast is not to scale (refer FIG. 12 for absolute)

Referring now to FIG. 11, there is shown a graph of a comparison between the end-user load profile forecast 1105 relative to the regional supply network demand forecast 1205 over a 48 hour period. This graph highlights a failure of current electricity network management systems in that an end-user's local peak load profile 1105 forecast of the second electrical network may differ in timing from the peak regional demand profile 1205 forecast of the first electrical network.

In the "Cost Capping Mode", demand response options provided by the controller include, but are not limited to, at least one of the following actions:

(1) Sending appropriate signals to appliances/devices within the second electrical network to alter the power consumption modes (e.g., turn off (if extended periods of time scheduled for demand response), standby, or enter partial mode). Alternatively, several thresholds can be set $CM_1, CM_2, \ldots, CM_i$, which trigger different demand response signals to occur within the second electrical network.

(2) Switching circuits within the second electrical network to remove the power from the first electrical network to the second electrical network.

(3) Initiating controlled power through at least one flow-gate control to at least a portion of appliances/devices connected to the second electrical network.

(4) Isolating the first electrical network from the second electrical network and utilising an alternate energy source.

During periods of high volatility it is possible that the end-user controller may oscillate or become unstable if not correctly constrained. The time constants involved for the minimum required operation are relatively long, however, control theory may be employed to accommodate the dynamic features of the second electrical network control if required. The time constants within the second electrical network are relatively long (approximate timescale of seconds to hours) and the system functions can be characterised by appropriate frequency dependent transfer functions.

Figure 13:
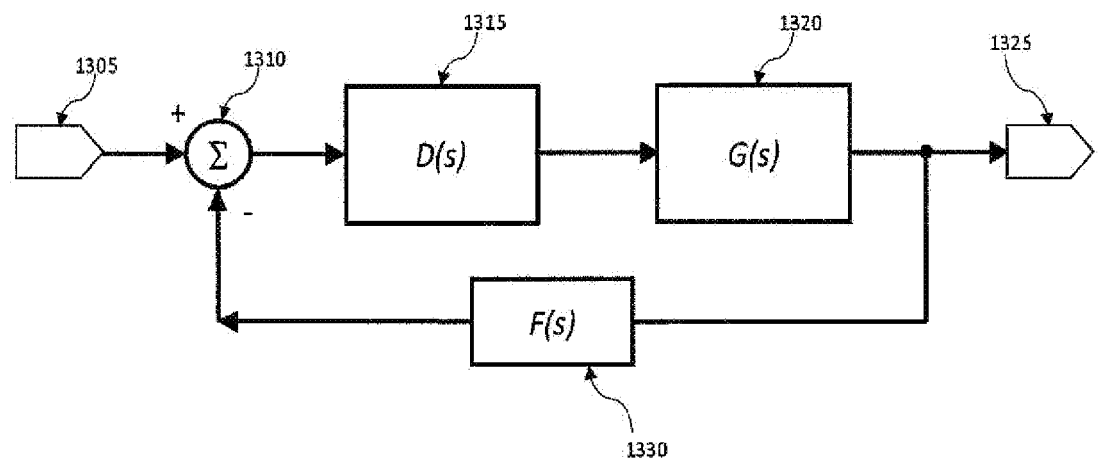
FIG. 13 is schematic representation of a control system to stabilise the generated demand response according to an illustrative embodiment.

Referring now to FIG. 13, there is shown a schematic representation of a control system to stabilise the demand response according to an illustrative embodiment. FIG. 13 shows a continuous representation of the second electrical network system, with input 1305, compensation transform $D(s)$ 1315 and plant transform $G(s)$ 1320. The variable s indicates the frequency dependence. The feedback transform $F(s)$ 1330 relates the output response 1325 to desired input set point 1305. The actual response of the system 1325 is then directly compared to the input set point at comparator 1310. The error in achieving the desired set point or the difference is then propagated to the forward path of the loop. Control theory using proportional (P), integral (I) and derivative (D) transform elements (known as PID control) may be integrated either within the control device or at a specific device being controlled within the second electrical network. For example, PID control of an on-site fossil fuelled generator allows for efficient and autonomous management and tracking of a real-time second electrical network load by supplying an optimal proportion of available on-site power capacity to meet the local demand. Applying a discrete Fourier transform to the demand response vector it is possible to provide a stable solution free from instability or oscillation. For example, a hysteresis in the transfer function of the threshold CM may improve the performance of the system.

Mode 2: Forecast Mode

The controller is capable of providing both a time-dependent regional smart-grid forecast and generating or estimating a local site load and/or consumption cost forecast. The local forecast is estimated or generated using local signals including, but not limited to:

a. Absolute time-dependent second electrical network power consumption. Historical databases are generated by the control device of the present invention.

b. End-user applicable temperature (e.g., in-door & outdoor temperature). Historical outdoor local temperature databases can be accessed via Bureau of Meteorology.

c. End-user TOU pricing. Historical TOU pricing databases can be accessed via Retailer and end-user.

d. Settled time-dependent regional wholesale prices. Historical wholesale region prices can be accessed via market operator databases.

e. Time-of-day signal that correlates to consumption pattern (e.g., seasonality, holidays, weekday, weekends).

f. Historical time-dependent regional demand. Relevant databases can be accessed at market operator server or via end-user.

The current signals are monitored and stored and then subsequently used by a forecasting method to estimate and predict a future short-term (ideally day-ahead) forecast of consumption profile, demand and or cost. The local load profile $L(t)$ can be set for time of use by the end-user by scheduling power consuming devices within the second electrical network or historical load data may be used to forecast a load profile at the end-user site. That is, based on historical loads for given environmental inputs such as local region temperature and time of year, a predictive algorithm can be used to generate a forecast load profile for the end-user based on current and forecasted temperature and time of year. The forecasted temperature can be made available from a metrology forecast entity, such as, the Bureau of Metrology.

Figure 14:
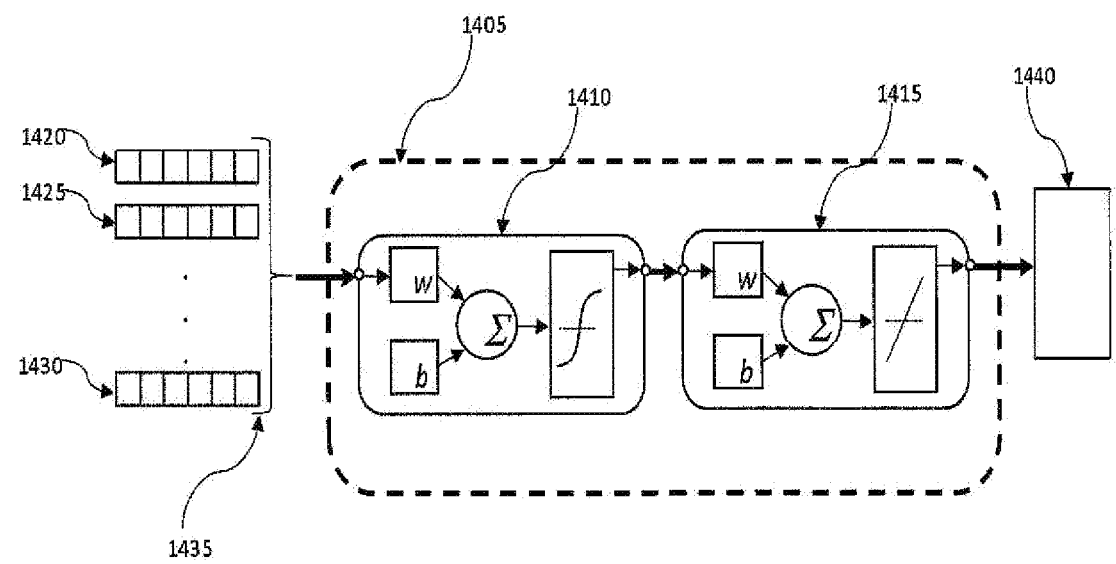
FIG. 14 is a schematic representation of a workflow for producing forecasting information for the second electrical network for use by a controller of the type illustrated in FIG. 3 according to an illustrative embodiment.

Referring now to FIG. 14, there is shown a schematic representation of a non-linear neural network algorithm (NNA) according to an illustrative embodiment which may be employed to generate a forecasting model. As appreciated by those of ordinary skill in the art, these computational methods may be employed to provide low error (in particular, the mean-absolute-percentage-error or MAPE) and good short term predictive capability for multivariable inputs that have a large range of values. In this illustrative embodiment, the MAPE is typically less than 10% (and more preferably less than 2%) to provide forecasting accuracy.

As would be appreciated by those of skill in the art, most smart-grid market operators utilise NNA type methodologies to generate the short term demand and price forecasts. With the advent of low-cost modern computing, such NNA's may also be adapted for end-user application. Ideally, long term historical datasets are advantageous for training NNA's and this can be achieved by generating a valid dataset for an end-user's local region over a period of time. The NNA can then be retrained with a larger historical dataset at any time, thereby improving the forecasting ability for the end-user application.

By establishing a validated forecast of the end-user demand profile, the end-user is then enabled to negotiate with a retailer to tailor a TOU schedule to meet both the end-user and retailers needs for reducing cost by minimising risk. In one example, an end-user would provide their forecasted end-user demand profile to either the retailer and/or market operator and commit contractually to the forecasted demand profile in exchange for a reduced cost TOU schedule as compared to a standard TOU schedule on the basis that the retailer is now able rely on this demand profile in their own forecasting. For example, if the end-user commits to consuming a demand forecast for a given time window based on a maximum price taking metric of CM and a forecast retailer price for a first electrical network, then the end-user can provide the retailer with a firm load profile and thus known cost structure.

In circumstances where on-site and on-demand power generation is available for the second electrical network, then the end-user can also offer to a retailer an end-user feed-in profile forecast based on a retailer regional feed-in price forecast. This enables the retailer to purchase power from a regional end-user in preference to the central market operator. In yet another embodiment, an end-user may determine a local load profile and a feed-in profile based on the consumption of fossil fuel energy for on-site power generation. The end-user can the offer to the fossil fuel retailer or provider a commitment for consumption of fossil fuel and as a result negotiate a reduced tariff compared to ad-hoc usage. For example, the applications processor 340 of the control device 305 illustrated in FIG. 3 further performs an end-user specific load and or consumption forecast as described above. In one illustrative embodiment, a 2-layer feed-forward (2LFF) NNA is employed to perform an accurate forecast based on historical inputs and responses at the end-user second electrical network. Other forecasting algorithms may be used as required depending on desired accuracy and associated computational burden but the applicant has found that a 2LFF NNA is sufficient to achieve the outcome required for most purposes.

Referring again to FIG. 14, there is shown schematically one illustrative embodiment of a process for calibrating and training a simple 2LFF NNA 1405 using input vectors 1435 comprising historical predictors 1420 & 1425 and responses 1430 which are then fed into Levenberg-Marquardt algorithms 1410 & 1415 (equivalently known as the damped least-squares (DLS) method). This provides a numerical solution for minimising the non-linear function over the space of input vectors. The NNA is then trained over sufficient epochs to result in a predetermined error in a set of validation data. The resulting weights w and biases b of the NNA can then be utilised as part of a forecasting engine.

The output of forecaster 1405 is a predictive equation 1440 which can be used to provide a forecast based on current inputs. The current inputs being, for example, the time of year over the new forecast and the temperature forecast. The set of equations 1440 can as a result then be used to provide in one example a load forecast. This load forecast can then be continually updated with new actual loads, settled prices and temperatures as this information becomes available.

Figure 15:
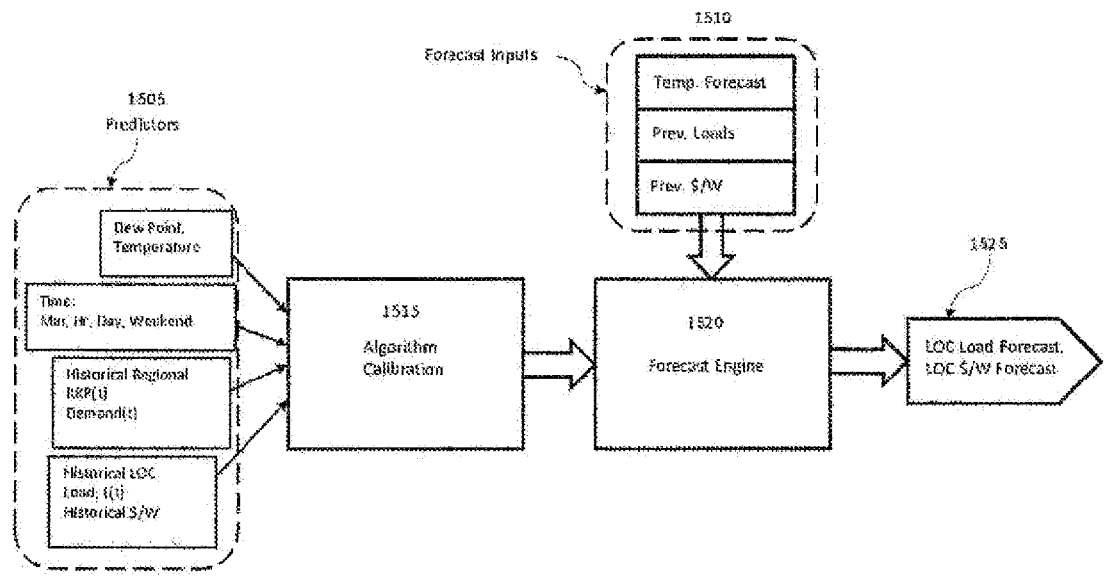
FIG. 15 is a schematic representation of the implementation of a neural network algorithm according to an illustrative embodiment for generating a load profile forecast for the second electrical network.

Referring now to FIG. 15, there is shown a work flow for creating the forecasting information according to an illustrative embodiment comprising an initial predictor data set 1505 which is used to train the NNA in step 1515 which is then used by forecast engine 1520 to forecast the required dataset 1525 or forecasting information using new forecast inputs 1510.

As an example, once a forecast engine is computed based on historical second electrical network predictors, a new set of predictors based on temperature and previous load profiles are then used to create a new estimated forecast dataset. For example, the temperature forecast can be uploaded from readily accessible publicly available databases (e.g. Bureau of Metrology in Australia for a specific geographic region applicable to the end-user) or alternatively through paid subscriber services as the case may be. This data retrieval would typically be automated and built into the control device system.

Figure 16:
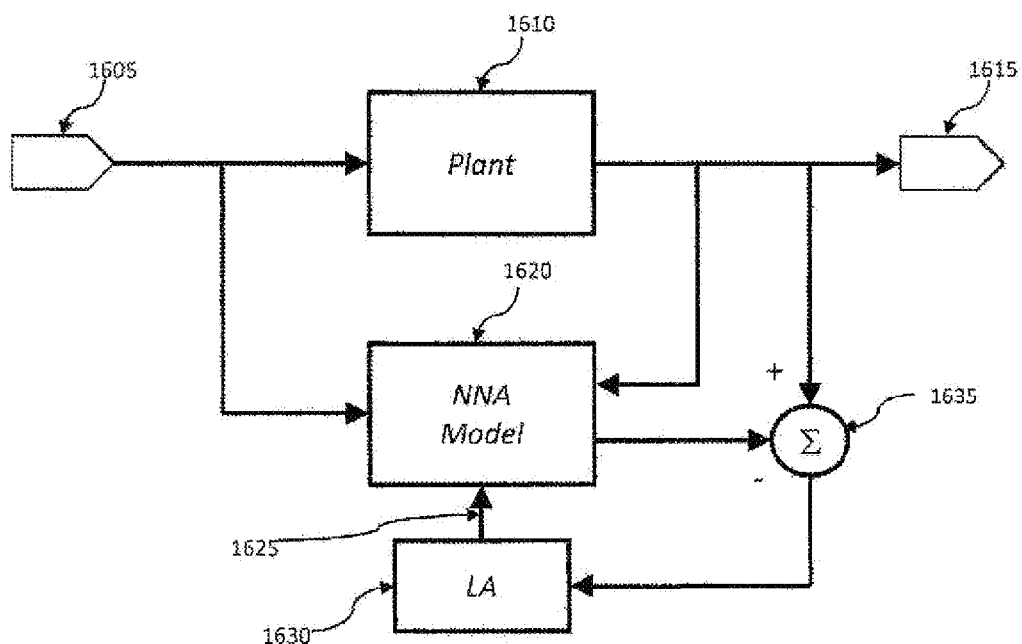
FIG. 16 is a schematic representation of a control system for training of the second electrical network neural network algorithm model as illustrated in FIG. 15 to optimise the load profile forecast of the second electrical network in response to the input demand forecast from the first electrical network.

Referring now to FIG. 16, there is shown a control system to optimise predictive control of an end-user plant forming part of the second electrical network in response to the input forecast 1605 from the first electrical network. The time dependent power flowing into the second electrical network from a first electrical network is consumed by the plant 1610 which may in turn have additional on-site and or storage capability. According to the control system, the plant's 1610 operation may be optimised by using predictive training of control parameters as described with reference to FIG. 16. In one illustrative embodiment, a NNA model 1620 is trained off-line while the plant is in operation. The NNA uses the plant inputs 1605 and outputs 1615 as well as the error 1635 between the actual plant output 1615. The error 1635 is used initially within a learning algorithm (LA) 1630 to set the weights 1625 of the NNA model 1620. Once the NNA has been trained, learning algorithm 1630 is disconnected and then standard predictive control topologies can be used to optimise the plant control inputs, such as CM to improve the outcomes of the plant when presented with the first electrical network forecast.

Other optimisation processes are also possible for improving a demand response within a second electrical network due to the forecasted response of a second electrical network. As an example, these optimisation processes may include, but are not limited to:

(i) providing a second electrical network that includes signal feedback from at least a portion of the available sensors that are transmitted to the control device indicating the state of a particular element comprising the second electrical network so that a reliable system response can be dispatched;

(ii) providing a frequency response model of the second electrical network comprising different functions of the second electrical network, and the said model implemented within the control device so that a temporal demand response can be implemented without adverse behaviour within the second electrical network;

(iii) providing a means for the transfer of power between a second electrical network power source and a first electrical network which is synchronised in electrical phase so to provide substantially uninterrupted flow to at least one of first network or second network;

(iv) providing a mathematical model of the components comprising the first electrical network and the second electrical network which can be implemented in a computational algorithm of a second electrical network control device so as to optimise at least one of the power capacity of an element, temporal response of an element, function of an element, signal type and transfer between elements and between elements and the control device where the signal feedback from elements comprising the system is used advantageously to provide stable response to a desired system demand response; or (v) provide at least one of predictive dynamic models and forecast of elements comprising the system which can be used to provide advantageous forecast of a system demand response.

Mode 3: Source Switching to On-Site Generation

Figure 17:
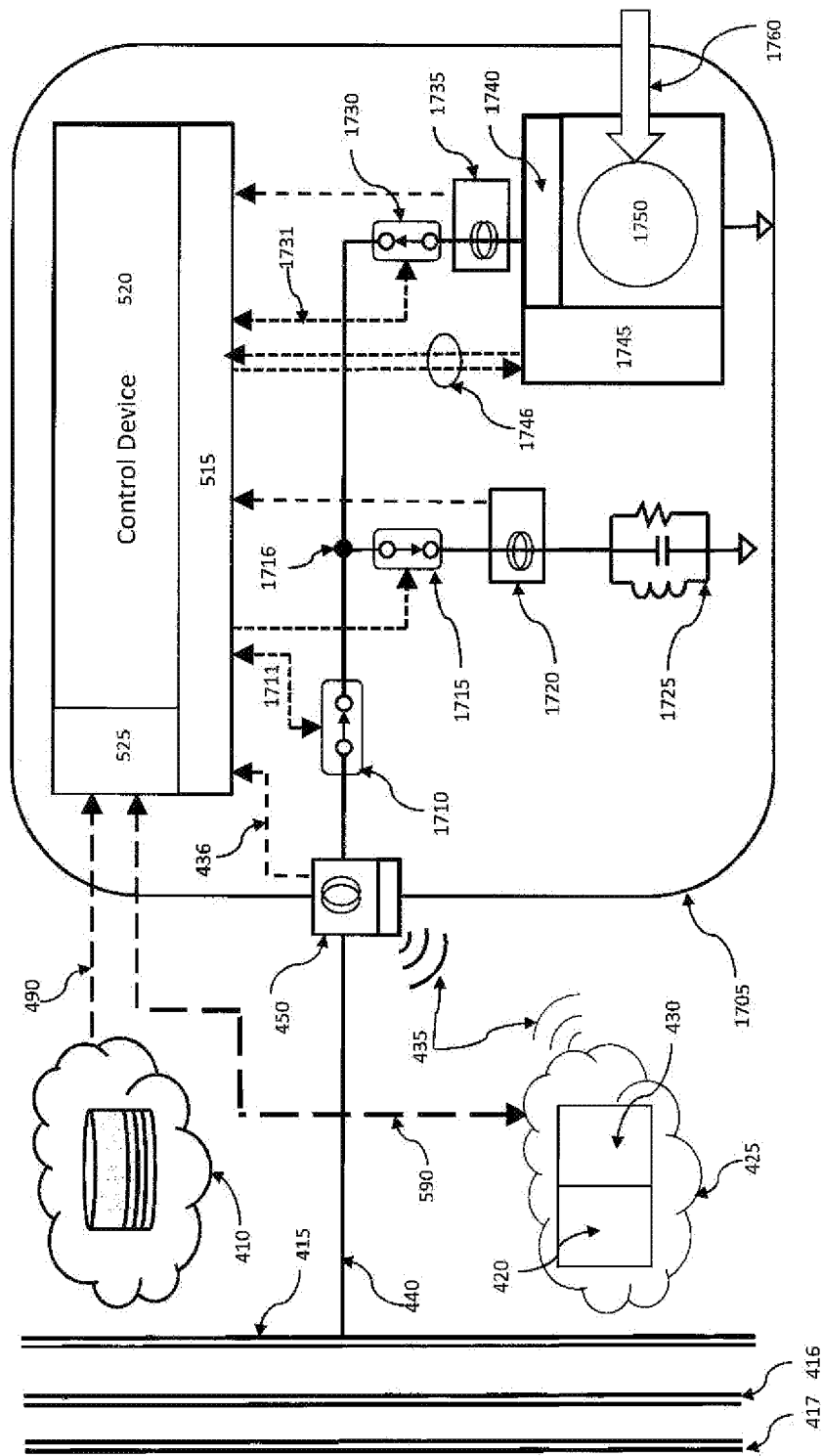
FIG. 17 is a schematic representation of a hardware configuration in accordance with an illustrative embodiment where the second electrical network includes a controller of the type illustrated in FIG. 3 and on-site power generation plant.

Referring now to FIG. 17, there is shown a schematic representation of a hardware configuration in accordance with another illustrative embodiment of the present invention where the second electrical network is enabled with on-site power generation 1750. Depending upon the pricing signal afforded by the enablement of access to the forecasted first electrical network RRP(t), the end-user is then able to choose from a number of options including, but not limited to:

(i) consuming power from the first electrical network;

(ii) isolating at least a portion of the second electrical network from the first electrical network and consuming power generated on-site;

(iii) isolating a portion of the second electrical network and providing power from the second electrical network to the first electrical network; or (iv) advantageously leveraging the TOU pricing for feed-in tariff by supplying high value power to the first electrical network.

FIG. 17 depicts schematically the second electrical network 1705 enabled with the pricing information from the first electrical network including the retail price forecast, demand forecast and feed-in tariff forecast profiles of the first electrical network and further including on-site power generation. The power generation plant 1750 may be of renewable type such as solar photovoltaic, solar-thermal, wind, landfill gas or the like or be a fossil fuel powered generator or any combination of these electrical power sources.

Renewable type electricity generators have essentially zero fuel cost and are powered by environmental energy 1760 such as solar photons and wind velocity. Renewables are in general semi-dispatchable and at best exhibit poor regulation of power, but offer at best opportunistic generation that is typically not coincident with high value power feed-in for TOU tariff to the first electrical network. In general, renewable energy is best consumed by the second electrical network if the load profile warrants otherwise it can be fed into the first electrical network. Alternatively, a fossil-fuelled generator 1750 fuelled by source 1760 can be used with cost of generating on-site electrical power characterised by LPC. Fuel cost and generator efficiency are the single most important parameters determining the LPC within the second electrical network. Power condition system 1740 and generator control module 1745 are shown to provide optimal performance of the generation plant.

Furthermore, a fossil-fuelled power generation plant 1750 offers the potential for on-demand power generation and is therefore fully dispatchable at call by the demand scheduler of the control device 520 and can therefore advantageously engage with the real-time market if required. For such a case where all three phases 415, 416 & 417 are utilised within the second electrical network 1705, then appropriate power measurement devices and smart transfer switches can be utilised for control of three independent second electrical network loads generalised in type as element 1725.

FIG. 17 further discloses the advantageous use of smart power transfer switches 1710, 1715 and 1730 for achieving the programmable decisions described above. Second and third power measurement devices are disposed within the second electrical network to monitor the system 1705 performance. The generalised second electrical network load is shown as 1725. The second electrical network system 1705 is shown in FIG. 17 connected to a single phase supply 415 of the first electrical network.

As would be apparent, the second electrical network 1705 may also be configured for demand response control of all three available first electrical network supply phases 416 & 417, respectively. The uni-directional or bi-directional communication paths between passive and active devices and the control device are represented, by example, via 590, 490, 436, 1711, 1746, 1731. Power flow from a first electrical network 415 or a second electrical network generation source 1750 can therefore be controlled into a common load point 1725.

The load 1725 may either completely or partially consume the power generated within the second electrical network 1705, with surplus power generated by 1750 metered into the first electrical network for a transaction gain to the end-user in accordance with the feed-in tariff provided by the first electrical network. Sensors 1720 and 1735 optionally provide measurement of instantaneous power and or phase and the values are sent to the controller 520. The electrical summation point 1716 provides a vertex for either power flow into the load 1725 from either the first electrical network 440 or via the on-site generation plant 1750. If the on-site generation plant has voltage output that is synchronized in phase with the first electrical network then transfer switches 1710, 1715 and 1730 are optional. For example, an inverter 1740 can be synchronised to a first network phase and the provide voltage output that is slightly higher than the line voltage of the first network. If the on-site generator 1750 is providing power to the second electrical network then power flow will into the load 1725 and any excess will be coupled to the first electrical network.

A specific issue arises for on-site power generation within the second electrical network regarding cross-over events from a first electrical network and vice versa. By the very nature of alternating current power networks, a substantially fixed and common oscillation frequency is preferable for both the first electrical network voltage source 415 and second electrical network generation source 1750.

Figure 18:
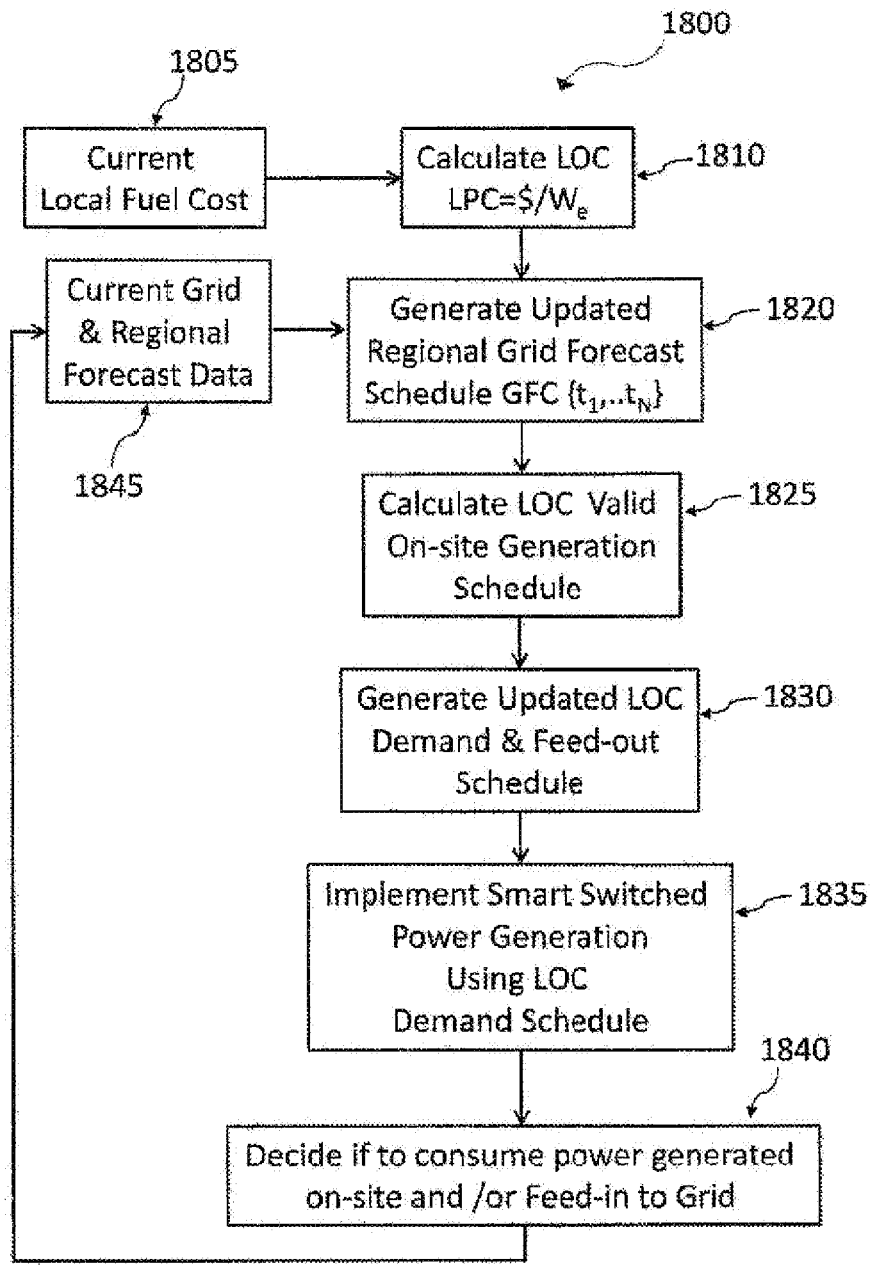
FIG. 18 is a process flow diagram for the hardware configuration illustrated in FIG. 17 as implemented in the controller utilising an on-demand dispatchable local generator in accordance with an illustrative embodiment.

Referring now to FIG. 18, there is shown a process flow diagram 1800 for operation of the second electrical network according to an illustrative embodiment to efficiently achieve lowest cost of power delivered to a load 1725 or high value added power delivered from the second electrical network to the first electrical network. The local fuel cost is calculated to enable direct comparison with the local on-site power generation cost LPC. The second electrical network is now fully enabled to compete directly with the wholesale cost of producing power in the first electrical network.

The grid forecast schedule 1820 is calculated based on comparing the first electrical network forecast 1845 with the LPC 1810. The on-site generation schedule 1825 is calculated for time segments in the forecast. When the LPC is lower than the current grid or first electrical network forecast the end-user can consume the on-site electrical power and also provide the excess power generated back into the first electrical network. The basis for determining when to provide power to first electrical network is via reference to a feed-in forecast or schedule. As an example, a retailer may provide a forecast for feed-in tariff that varies with time of day or it may be fixed and frequently updated. The demand and feed-out schedule generated in step 1830 sets the configuration of the second electrical network devices and generation plant.

The decision in step 1840 to consume completely or feed-out at least a portion of on-site generation power from the second electrical network can be further based on the plant operating efficiency. For example, a fossil fuel powered generation plant operates with higher efficiency when operated at high load. Therefore, an end-user may seek to generate on-site power and only partially consume the electrical power within the second electrical network and provided advantageously the excess power to the first electrical network and or retailer.

Alternately, the second electrical network may include a renewable energy source and an electrical power storage facility. Depending on the time of feed-in price available, the end-user is able then to select the most advantageous outcome based on price-taking from and/or feed-in to a first electrical network. The regional grid forecast price 1845, as well as a regional price feed-in forecast, are in this example continually updated through the course of a 24 hour day and over a 7-day day look-ahead forecast period.

For the second electrical network it is clear that the true cost of on-site generation does not need to include a first electrical network transmission cost. Referring again to FIG. 18, the next step is to upload a valid forecast of the first electrical network price profile, then an on-site generation schedule may be calculated based upon the least cost of supplying power to the second electrical network load 1725 or maximum return to be gained by advantageous scheduling time of feed-in to the first electrical network in accordance with the feed-in tariff forecast profile provided by the first electrical network.

As would be appreciated by those of ordinary skill in the art, a fully dispatchable on demand generator 1750 optimally achieves both the minimisation of cost for consumed power from the first electrical network or maximises the financial benefit from supplying power from the second electrical network to the first electrical network.

Figure 19:
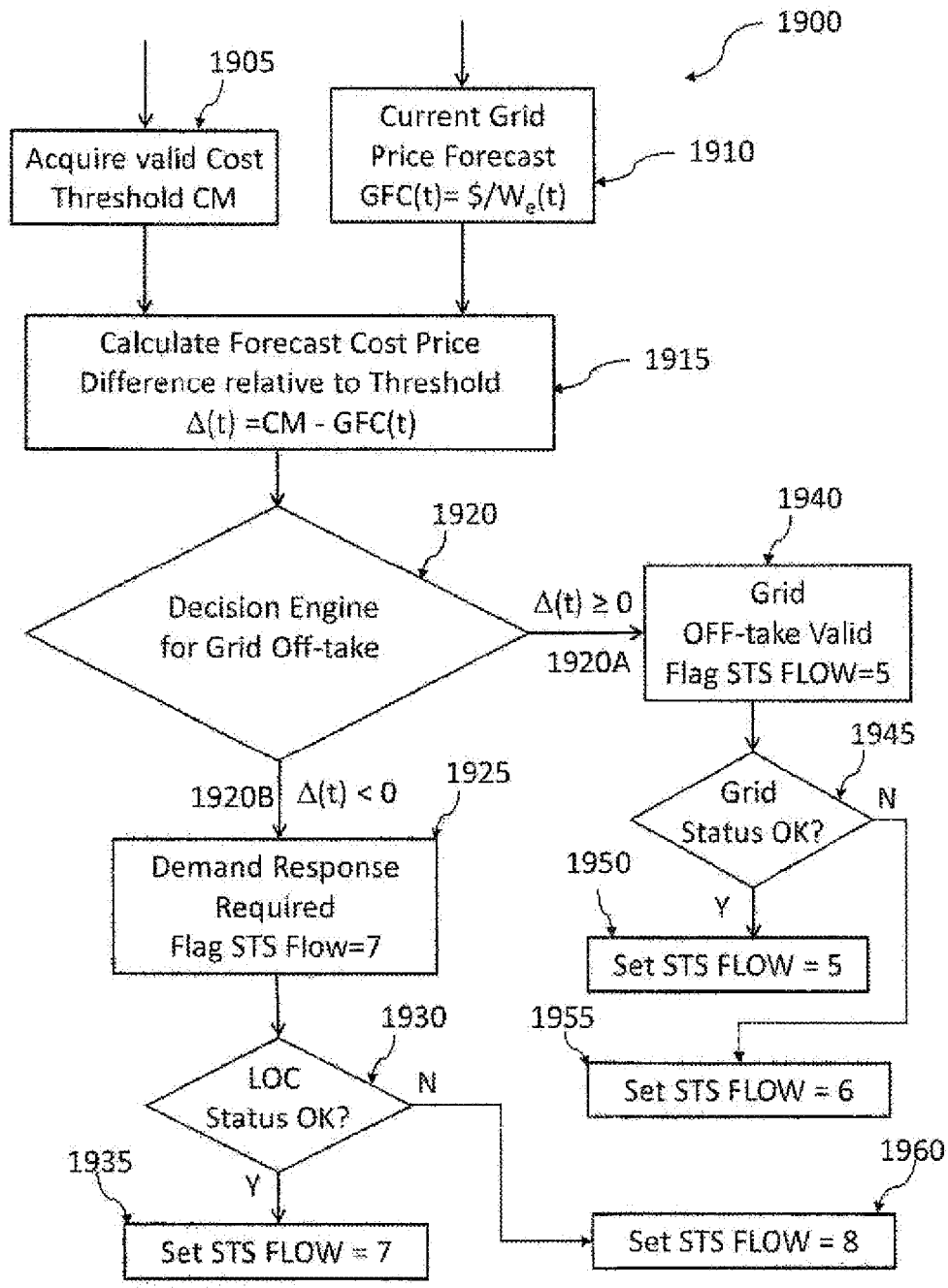
FIG. 19 is a flow chart for a decision engine for the hardware configuration illustrated in FIG. 17 as implemented in the controller for the case of on-site generation within the second electrical network.

Referring now to FIG. 19, there is shown a flow chart 1900 of the decision engine of the process flow illustrated in FIG. 18 and described above. The cost threshold CM for on-site generation is acquired at step 1905 is compared against a forecast cost profile of the first electrical network. A decision engine 1920 creates a demand response within the second electrical network which is acted upon when the given time segment becomes current. The acquisition loop is perpetually updated (for example, the new updated first electrical network cost forecast is updated every 15 minutes to 30 minutes) so that a new first electrical network cost forecast that reflects market events is signalled in substantially real time to the second electrical network control device. If the on-site power generation costs is lower than a first electrical network supply cost, then the second electrical network can either consume the power or trade the on-site generated power to the first electrical network at a cost advantage to the end-user.

Decision path 1920A flags the configuration of the second electrical network to preferentially consume power from the first electrical network symbolised as STS FLOW=5. Step 1945 ensures the first electrical network is available (for example free of fault and interruptions which can be checked via a valid line voltage). If the first electrical network is unavailable then on-site power can be requested if there exists a valid local demand, set as second electrical network configuration state STS FLOW=6. If the first electrical network is available, then the end-user is configured for consumption from the first electrical network. If the on-site generation cost is less than the price-taking from the first electrical network in a particular time interval, the decision path 1920B is enabled, flagging a request for on-site power generation, wherein the second electrical network is configured in state STS FLOW=7.

At step 1930 the states of the second electrical network demand profile are interrogated or queried. If the second electrical network does not require power then the on-site power generator can advantageously feed-in to the first electrical network provided a feed-in tariff greater than CM is available. This process is indicated at step 1960 where second electrical network configuration is in state STS FLOW=8. Such a demand response within a second electrical network provides a valuable service to the first electrical network and retailer. If power is required also within the second electrical network then it is configured as state STS FLOW=7 which can optionally also provide a portion of excess on-site generation into the first electrical network. It is understood that on-site power generation may be provided by a fossil-fuel source, photovoltaic and/or stored energy provided by fuel-cell or battery banks depending on configuration.

The fuel costs for a fossil-fuelled generator 1750 directly determine the cost of producing on-site second electrical network power. In an illustrative embodiment, a fossil fuelled generator plant 1750 may include, but not be limited to:

(i) a reciprocating multi-stroke engine with at least four or more stroke cycles;
(ii) a gas-turbine;
(iii) a natural gas fuel cell; or
(iv) any combination of the above.

Natural gas, methane and or propane are generally desirable for embodiments incorporating a fossil fuelled multi-stroke reciprocating engine. Furthermore, a high efficiency generation plant is preferred for use as 1750. The high efficiency engine comprises a high efficiency reciprocating engine for producing a rotational energy for coupling to an alternating current or direct current generator module. If the efficiency of the reciprocating engine is $\eta_{RE}$ defined as the ratio of rotational energy measured at the shaft of the engine compared to the energy content of the fossil fuel feedstock, then it is preferred that the reciprocating engine provides an efficiency greater than 30% and more preferably greater than 35% and even more preferably greater than 60%.

Wasted energy is commonly accounted for as waste heat which can be further recovered using thermoelectric modules advantageously placed within the engine. Further, if the electrical generator module has efficiency $\eta_{EG}$ which is defined as the ratio of electrical energy produced relative to the energy delivered at the rotating shaft of the generator, then it is preferable that $\eta_{EG} > 80\%$ and more preferably $\eta_{EG} > 90\%$, and even more preferably $\eta_{EG} > 95\%$.

The total efficiency of the on-site generation is then the product $\eta_{Tot} = \eta_{RE} \eta_{EG} \eta_{PC}$, where $\eta_{PC}$ is the efficiency of the power conditioning and conversion module 1740. As would be appreciated by those of ordinary skill in the art, $\eta_{Tot} > 30\%$ is preferable, with $\eta_{Tot} > 35\%$ more preferable, and $\eta_{Tot} > 40\%$ even more preferable. If an on-site generation plant exhibiting $\eta_{Tot} > 50\%$ is utilised then the first electrical network would only be used as an emergency backup if fossil fuel supply to the second electrical network was interrupted or depleted.

Figure 20:
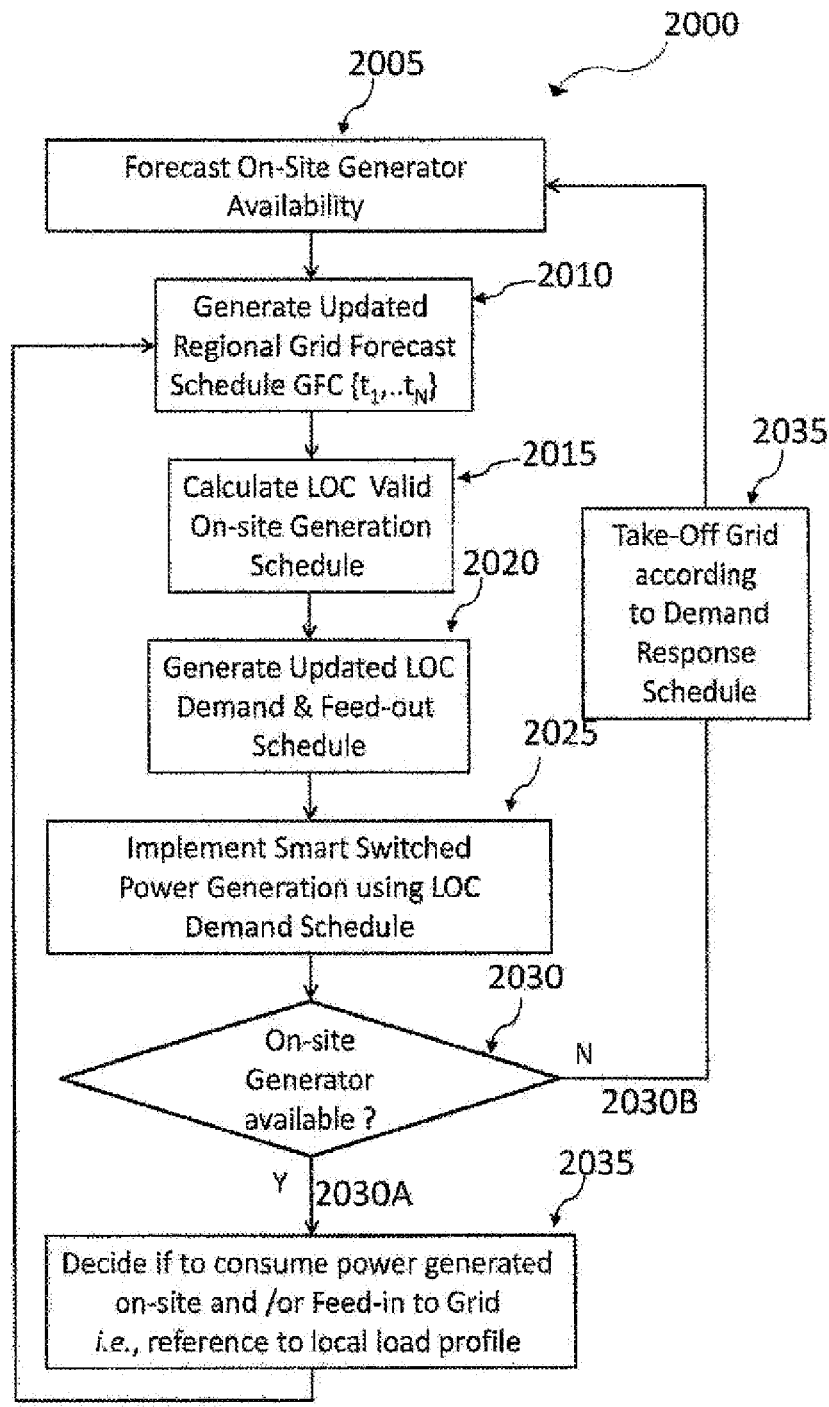
FIG. 20 is a process flow diagram for the hardware configuration illustrated in FIG. 17 as implemented in the controller according to an illustrative embodiment capable of utilising an on-demand dispatchable local generator.

Referring now to FIG. 20, there is shown a process flow diagram 2000 of an illustrative embodiment employing a photovoltaic on-site power generation. A photo-voltaic generation day-ahead forecast can be performed to obtain an on-site generation availability schedule 2005. The photovoltaic generator availability forecast can be provided by an external service (for example by the first electrical network market operator) or estimated on-site by predictive algorithm such as shown in FIG. 16. Next, the first electrical network forecast 2010 is uploaded into the control device. An optimal on-site generation schedule 2105 is calculated against a second electrical network load profile. Step 2020 then calculates the optional consumption within the second electrical network can be implemented or an advantageous feed-in to the first electrical network in the case of load profile not requiring power or end-user feed-in tariff maximisation sought, as the case may be.

Step 2025 generates a time dependent event driven demand schedule within the second electrical network. The demand schedule can also be forecast based on the method described in FIG. 16. The photovoltaic status prior to event switching is interrogated for validity (i.e., is power available from the photovoltaic plant). If insufficient or no power is being generated by the photovoltaic plant then decision path 2030B has power then sourced from the first electrical network or on-site storage if available. If the photovoltaic plant is valid, decision 2030A proceeds and power is either consumed within the second electrical network or provided to on-site storage or provided to the first electrical network.

Either way, the systems as shown in FIG. 17 is capable of providing uninterruptable supply of power while fully leveraging the least cost source of energy at one time. This is leveraged by the second electrical network accessing pricing information in the form of real-time forecasting data from the first electrical network. This solution provides an optimal solution to demand response and addresses the peak demand issues of standard electrical distribution systems as outlined for current systems. The second electrical network is enabled with the function of peak shifting consumption away from a first electrical network TOU tariff and real time demand and cost forecast.

Mode 4: Source Switching to On-Site Storage

Figure 21:
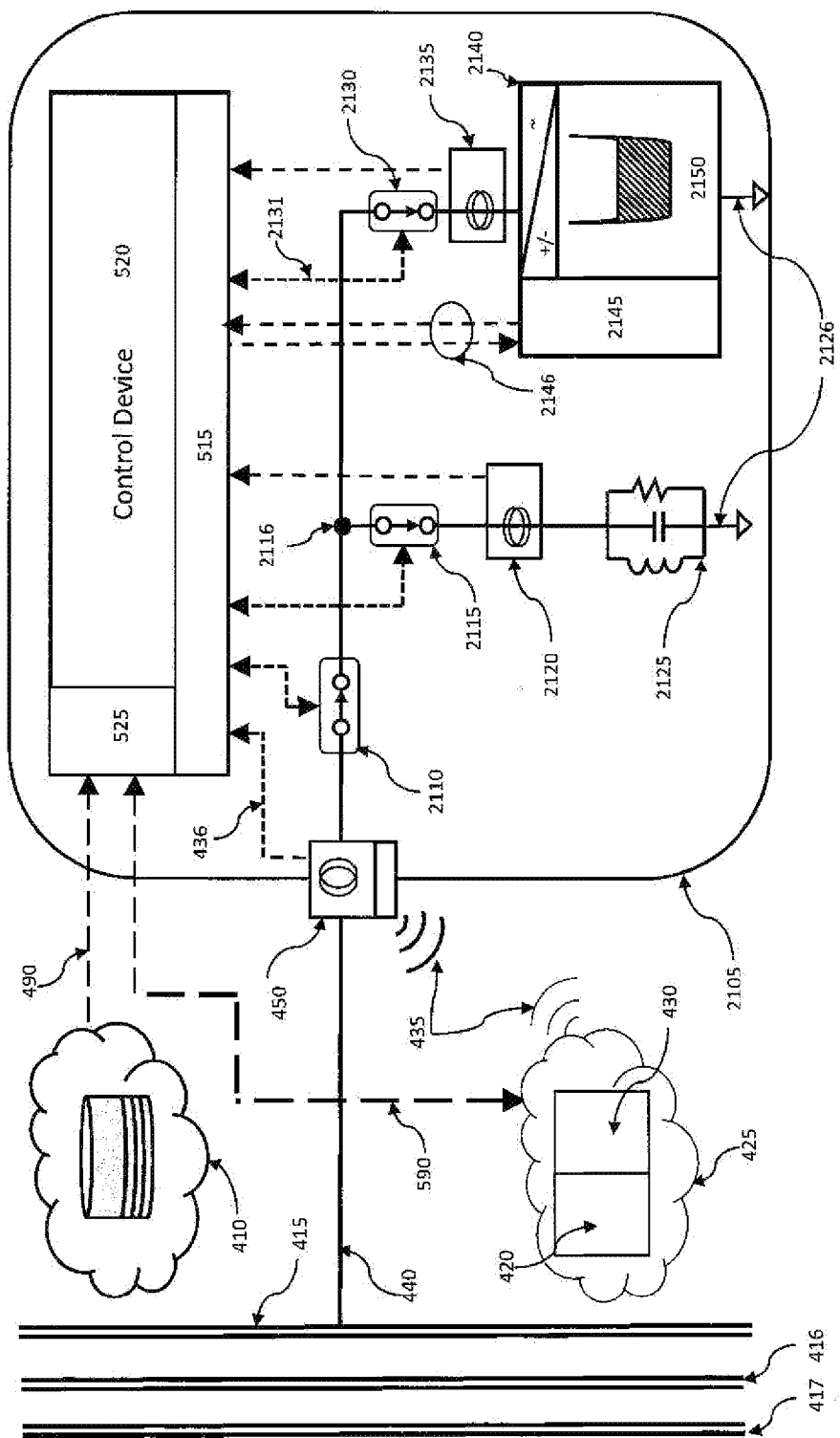
FIG. 21 is a schematic representation of a hardware configuration according to an illustrative embodiment where a second electrical network includes a controller and on-site power storage plant.

Referring now to FIG. 21, there is shown a schematic representation of a hardware configuration in accordance with an illustrative embodiment for load shifting a second electrical network consumption profile as observed and monitored by a first electrical network. This embodiment is based on the observation that TOU tariffs offer remarkably lower cost of electricity in so called off-peak times where regional demand is low and the cost of electricity generation is low (e.g., typically in the evening and early morning when wind power comes on line). Unless wind power can be shed within the first electrical network it is lost to the system and typically collapses the spot price on the first electrical network electricity market.

In this illustrative embodiment, the hardware configuration includes on-site power storage at the site of the second electrical network. Electrical energy may be efficiently stored in an energy storage device 2105 for a finite amount of time by a number of different arrangements including but not limited to:

(i) reversible hydrogen-oxygen fuel cells;
(ii) fossil fuelled electrochemical fuel cells;
(iii) electrolyte batteries;
(iv) chemical batteries;
(v) electromechanical flywheels;
(vi) compressible media to store energy which can be controllably released to impart rotational energy to drive conventional generation plants; or
(vii) any combination of the above.

Storage device 2150 as shown in FIG. 21 is depicted with optional power conditioning system 2140 (for example an ac-dc inverter) and storage device control system 2145. The power conditioning system includes at least one of a surge suppression action, voltage frequency selection, phase selection and synchronisation of an alternating voltage provided by the storage device, selection of switch mode power supply and providing relevant status signals and the availability of the said storage device.

Again, a second and third power measurement device 2120 & 2135 are connected to at least one of a programmable power transfer switches or smart transfer switches provided by 2135 & 2130 and 2110 (see also FIG. 17). Transfer switches 2130, 2110 and 2115 are optional if the storage plant provides phase synchronized voltage with respect to the first electrical network. A generalised reactive second electrical network load is represented as 2125. The intelligent transfer of providing a source of power to the load 2125 is controlled by the control device comprising controller 520, interface 515 & and communication links 525. The source of power is chosen from a first electrical network 415 and or the power storage module comprising the physical power storage element 2150, power conditioning module 2140 (such as an inverter) and power control module 2145.

The current summing vertex 2116 can be used to monitor the flow of current into the load 2125, and also the power flow into and out of the first electrical network. That is, if the storage element is coupled to the second electrical network via inverter providing suitably higher voltage than the line voltage of the first network, then current will flow into the load and or the first electrical network, wherein the electrical power TOU meter 450 records the flow. The retailer is coupled to provide information 425 to the end-user for TOU price taking tariff and optionally time of feed-in tariff. The retailer may transmit information and/or receive information relating to the instantaneous power flow measured by a power meter 450.

The information may be transmitted by wired or wireless links and aggregated by an approved data service which is then provided to the retailer 425. The first electrical network comprising three phase connections 417, 416 & 415 (referred to ground voltage 2126) provides a region price forecast and demand forecast 410 which is communicated to the controller 520 via wired, optical or wireless link. Cloud based data sources are accessible via internet connectivity and provides substantially real time communication for the end-user, retailer and first network market operator alike. Internal communication links such as 2131 enable the controller 520 to control or sense devices within the second network.

In accordance with this illustrative embodiment, the current valid first electrical network price forecast is used to advantageously source low cost energy to charge on-site storage device 2150. Once charged, during off-peak and or low price specific times, storage device 2150 can be used to shed second electrical network peak demand and as a result reduce the overall cost to the end-user for a given load profile. That is, the storage device 2150 is capable of providing sufficient electrical current and voltage over times spanning at least the peak period of energy usage required by a second electrical network load profile. Greater storage capacity is advantageous for feeding power back into the first electrical network at an advantageous time-of-feed-in.

By enabling the act of load shifting where energy is consumed during substantially off-peak times, and the off-peak consumed energy is then stored as electrical power in the storage device 2150, the stored power can then be advantageously discharged to provide a source of power during non-off peak time, thereby substantially reducing (up to a factor of a half) the end-user's total consumption costs.

Figure 22A:
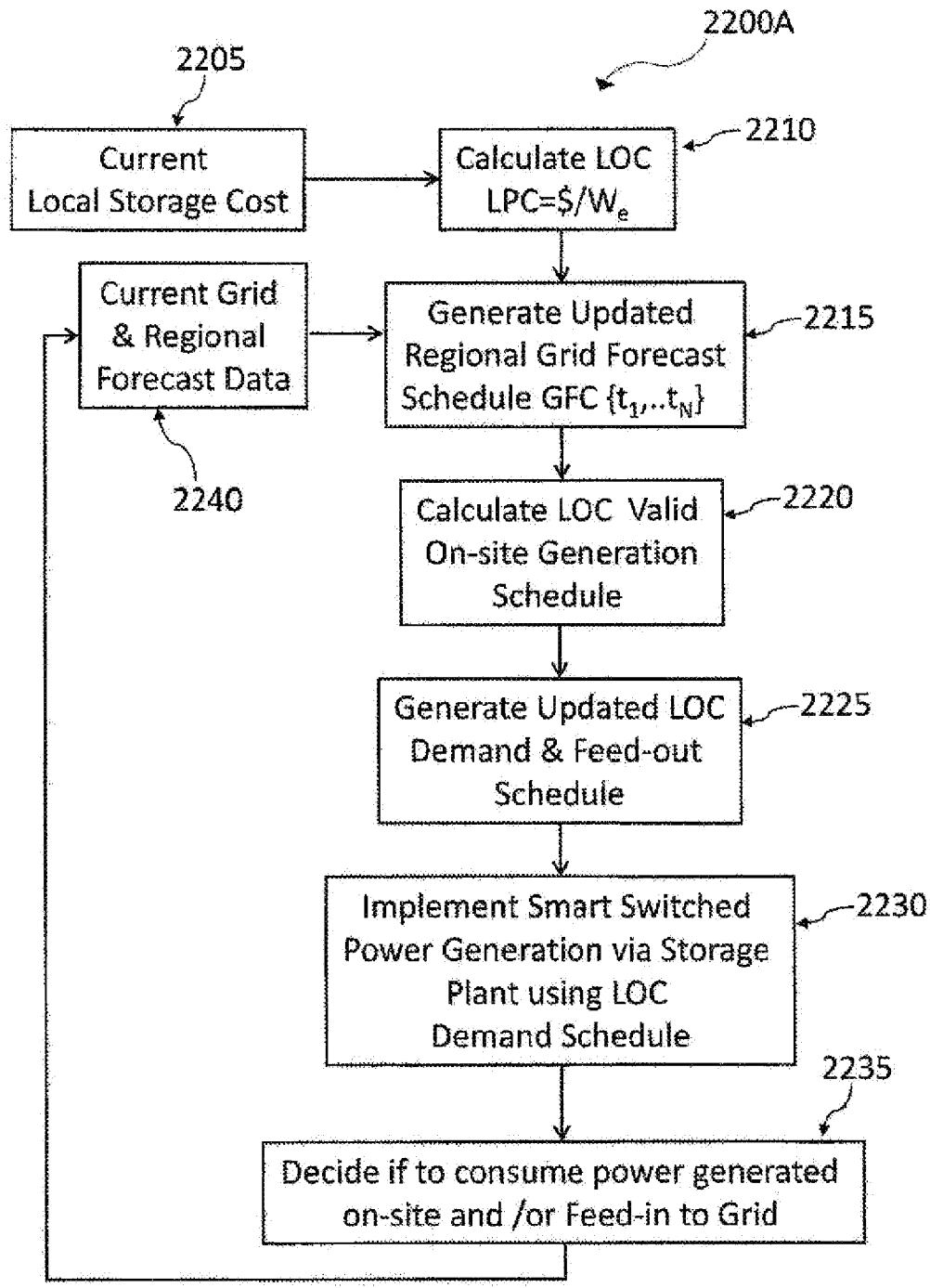
FIG. 22A is a process flow diagram for the hardware configuration illustrated in FIG. 21 as implemented in the controller of a second electrical network interacting with first electrical network enabled by use of on-site storage and access to first electrical network price forecast.

Referring now to FIG. 22A, there is shown a process flow diagram 2200A of a second electrical network interacting with a first electrical network where the second electrical network includes synchronised on-site storage with an enabled access to the first electrical network's cost forecast. Initially the storage cost of electricity is calculated at step 2210 (also accounting for time dependent leakage), then an updated smart grid forecast 2215 is acquired for the first electrical network and is used to calculate the advantageous charge and discharge events appropriate for an end-users load profile. Ideally, the storage device is charged using low cost energy source. For example, the energy source for charging the storage device is selected from low time of use price from a first electrical network. Step 2225 generates an event schedule for configuring the second electrical network based on whether power is to be consumed in the second electrical network load or fed back into the first electrical network by discharging the storage element. The second electrical network load comprises dissipative load and a storage device load when charging. During discharge the power generated on-site can be completely, partially or not used by the end-user load. If the end-user is not consuming power then the stored energy can be supplied back into the first electrical network at an advantageous TOU feed-in tariff and as a result maximise the end-users pay-back.

Step 2235 decides during each time interval as to the most advantageous configuration of the second electrical network. Storage devices can be of battery type and thus advantageously source low cost electricity pricing events from the first electrical network. Such mode is desirable for scavenging low pricing market short falls in the first electricity network, shedding of excess wind generation in the first electrical network and the like. Ideally, storage can be used for load shifting and thus can be scheduled. Such on-demand scheduling is advantageous for negotiating improved retailer tariff for first electrical network price taking.

Figure 22B:
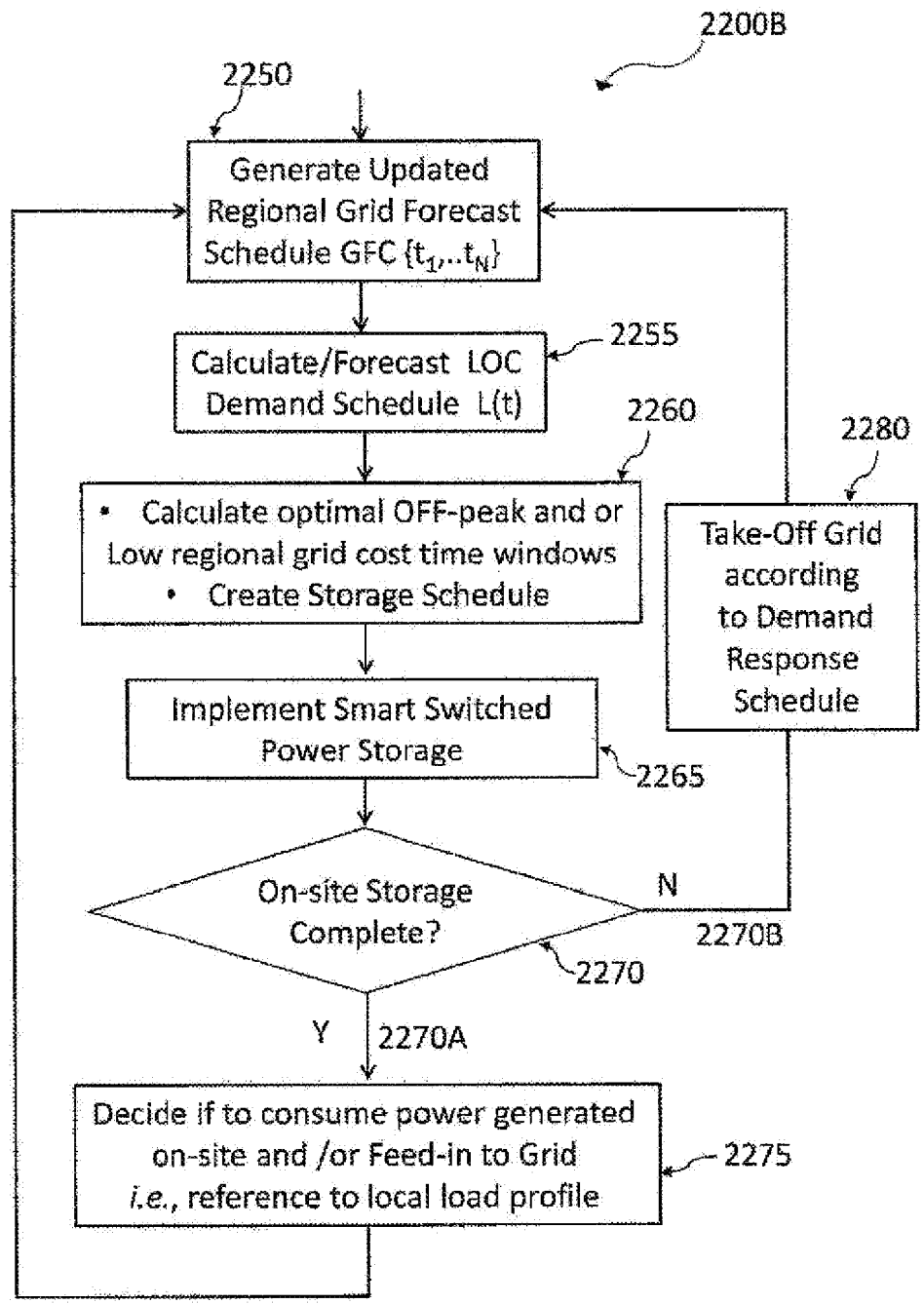
FIG. 22B is a process flow diagram for the hardware configuration illustrated in FIG. 21 as implemented in the controller of a second electrical network for interfacing between the first and second electrical networks to manage charging and discharging within the second electrical network and/or first electrical network to achieve an advantageous demand response for the second electrical network.

Referring now to FIG. 22B, there is shown a process flow diagram 2200B for a controller interfacing between the first and second electrical networks where the second electrical network includes on-site storage. As described above, the method seeks to maximise the off-peak and or low cost pricing events available from a first electrical network for advantageous consumption via on-site electrical power storage. Ideally, the storage plant is capable of a maximal amount of power to supply an end-user over at least a majority of high time-of-use pricing events over a 24-hour cycle in the first electrical network. The stored available power can then be utilised during peak time-of-use to service the second electrical network load or supply a metered amount back to the first electrical network at a cost benefit to the second electrical network (i.e. load shifting). Such demand response by the end-user is advantageous for both the end-user and the first network.

Step 2250 acquires the first electrical network forecast from either the market operator or the retailer. The forecast time sequence GFC is then directly compared to the end-user forecast demand schedule. A storage device charging schedule is calculated based on advantageous price-taking from the first electrical network. For example, the simplest implementation is for charging during off-peak tariff, however, small time interval RRP (e.g., 30 minute time interval 24 hour forecast of RRP) from the either the first network electricity retailer or the market operator can access extremely low pricing events over a 24-hour cycle and over a 7-day look-ahead.

Step 2265 implements the charging events as per the storage charging schedule. If on-site storage is completed or available (i.e. as partially complete cycle) the GFC is compared to the cost of the current storage cycle and a decision is made whether to discharge for advantageous use in the second network or for feed-in to the first electrical network. This load shifting utility is particularly advantageous if the storage facility is sized to supply the end-user over an entire peak TOU window. Clearly, coupling storage with renewable energy generation (e.g., photovoltaic) provides the necessary increase in value for on-demand power generation at an end-user site back to the first electricity network and or alleviates exposure to the peak TOU events provided by the first electricity network.

In another embodiment, a collection of similar end-users comprising individual on-site storage can then join together via a coordinated strategy or via a common retailer to produce a large volume supply back to the first electrical network and this coordination can then be used to leverage further increases in transaction benefits to the end-users from the first electrical network.

By way of yet another example, load-shift can be clearly demonstrated for efficacy once a controlled storage device according to the teaching of the present invention is utilised.

Consider an example TOU tariff structure offered in Australia during 2013 which is given as:
  (i) Peak tariff cost=53.819 cents/kW·hr during TOU window 2 pm-8 pm,
  (ii) Off-peak tariff cost=16.886 cents/kW·hr during TOU window 10 pm-7 am,
  (iii) Shoulder #1 tariff cost=35.3525 cents/kW·hr during TOU window 7 am-2 pm, and
  (iv) Shoulder #2 tariff cost=Shoulder #1 tariff cost during TOU window 8 pm-10 pm.
  (v) A daily supply charge is applied for retailer recovering meter services equal to supply_rate=71.045 cents per day.

The four distinct TOU windows set out above corresponding to a basic hourly tariff structure are designed to present a cost of electricity to deter end-users from consuming during peak demand regions.

Figure 23:
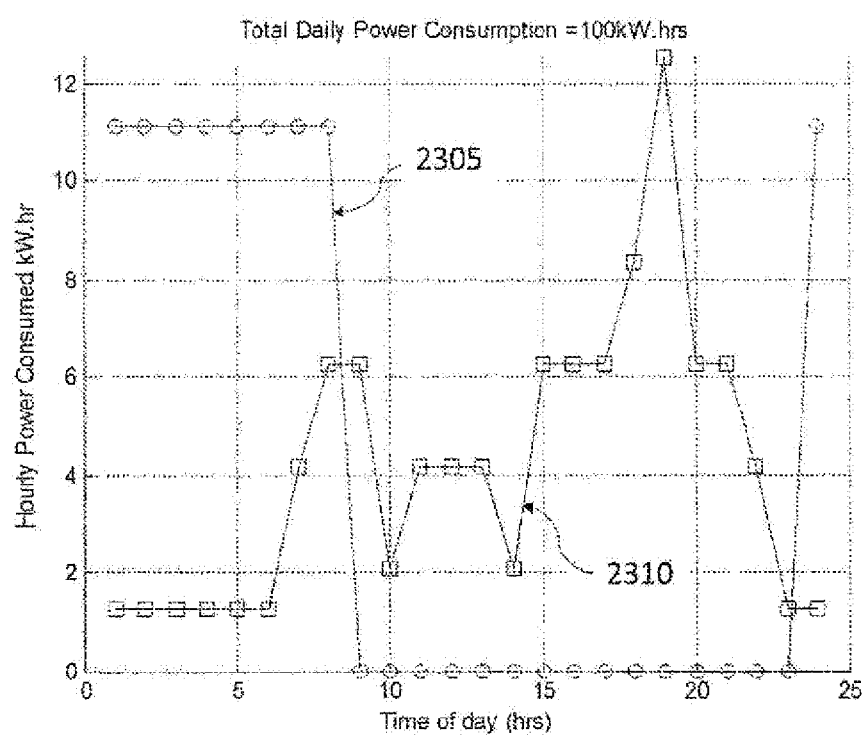
FIG. 23 is a graph of example load consumption profiles for the case of normal daily duty distributed throughout the TOU tariff windows (black circles) and 100% off-peak consumption where each load consumption profile is set to consume a total of 100 kW·hr over a 24 hr period.

Referring now to FIG. 23, there is shown a typical end-user load profile 2310 over a 24 hour period. If this load profile 2310 is a typical daily consumption characteristic it is possible to estimate the accumulated cost over a 28 day billing cycle. Load profile 2305 is a 100% off-peak consumption example. Both cases consume a total of 100 kW·hr over a 24 hr period.

Figure 24:
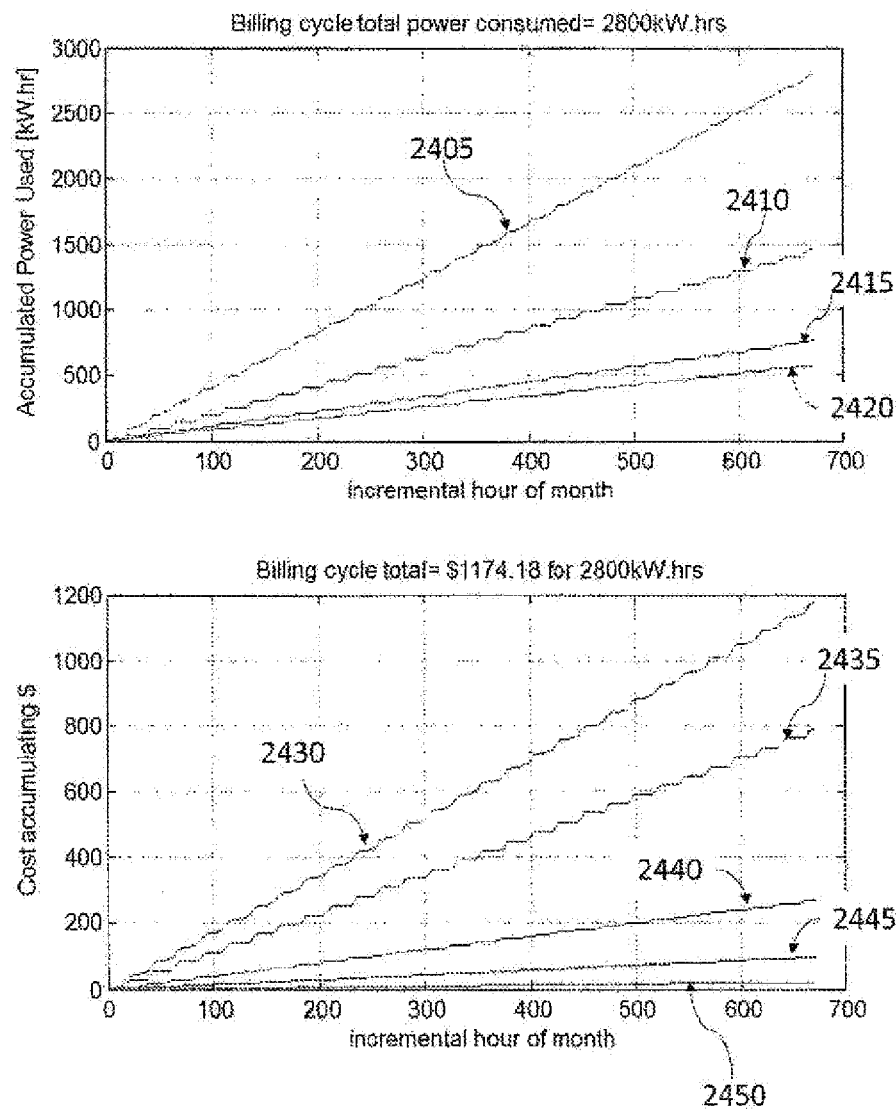
FIG. 24 is a graph of an example load profile accumulated over a 28 day billing cycle where the upper chart shows total power accumulated as a function of hour of month and where the lower chart shows the equivalent total accumulated cost, each chart also showing the breakdown corresponding to the different TOU tariffs.
Figure 25:
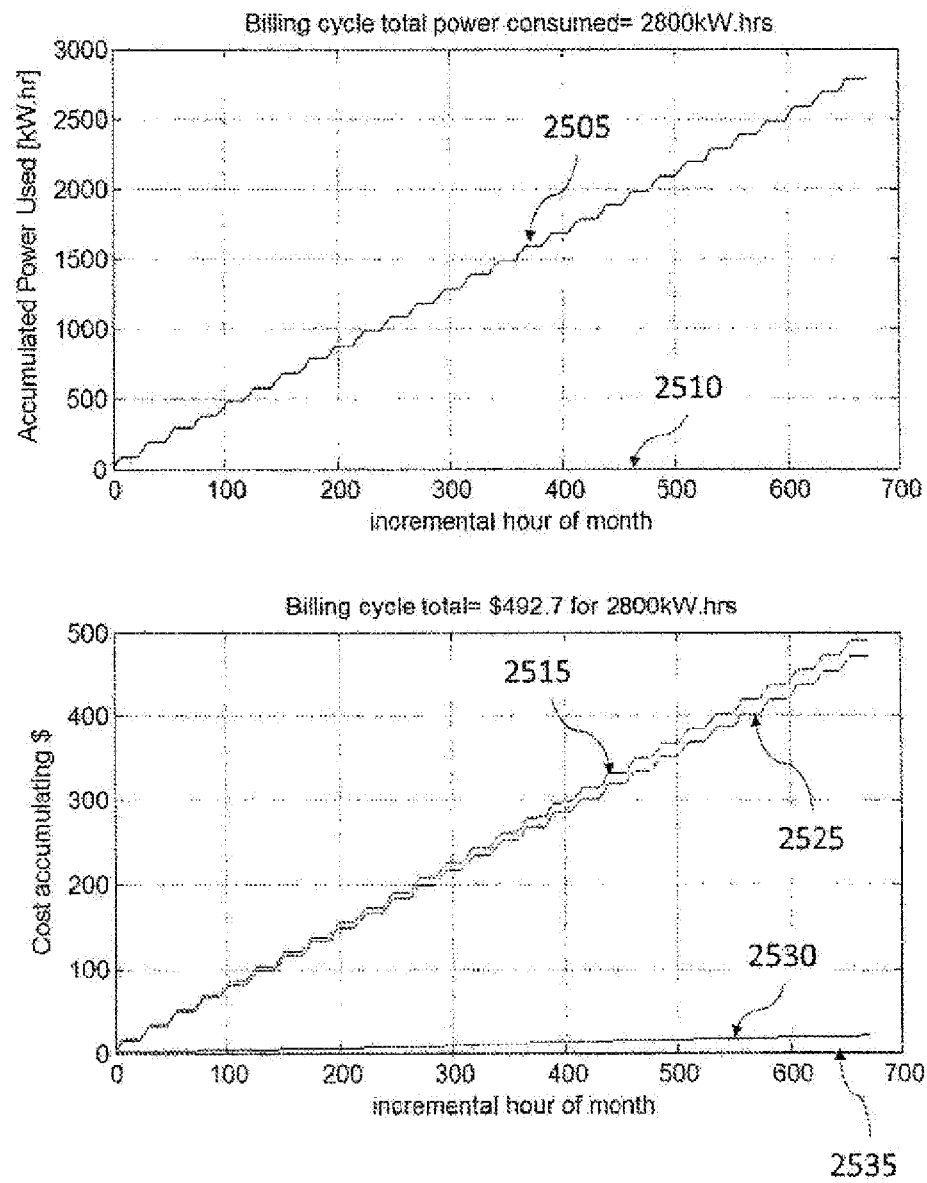
FIG. 25 is a graph of an example load profile (100% off-peak) accumulated over 28-day billing cycle.

Referring now to FIG. 24, there is shown a breakdown of power types consumed and the corresponding costs for each. Further, it is constrained that a total of 100 kW·hrs is consumed each 24 hr cycle, resulting in 2.8 MW·hrs for a total of 28 days. Shown is the total accumulated power consumed 2405 as a function of time of day (units of hours), the peak power component consumed 2410, the shoulder component of power consumed 2415, and the off-peak power consumed 2420. The corresponding costs incurred by the end-user are plotted in FIG. 25. The total cost accumulated 2430 is separated into the peak power cost 2435, shoulder power cost 2440, the off-peak power cost 2445 and the supply/service costs 2450. As is evident, peak time consumption incurs the highest penalty in cost component.

Consider now a system capable of translating all consumption solely during off-peak tariff TOU, as shown in the load profile of FIG. 23 curve 2305. The corresponding power consumed and costs are tabulated in FIG. 25. The upper chart shows total power accumulated 2505 as a function of hour of month. Lower chart shows the total accumulated cost 2515, off-peak power cost 2525 and supply costs 2530. The peak power cost 2535 and shoulder power costs are both nil.

The accumulated power 2505 over the 28 day billing cycle in this example is $492.70 for a total of $P_{tot}$=2.8 MW·hrs consumed which compares favourably to the example scenario illustrated in FIG. 24 where the total accumulated power over the 28 billing cycle is $1174.18. The supply charge 2530 is identical as the previous case, however, the peak and shoulder contributions are now nil.

As described previously, a storage device 2150 may consume sufficient energy over an off-peak charging cycle to enable a programmed discharge of electricity during TOU windows spanning peak and shoulder TOU events. That is, outside of off-peak hours, the second electrical network would be isolated from the first electrical network if power is consumed according to the load profile 2310 with zero consumption during shoulder and peak times within the second electrical network. During peak and shoulder TOU windows the second electrical network power source is then the stored energy source 2150 controlled within second electrical network system 2105 by the control device 520 and 445.

In another illustrative embodiment, the control device configured using the stored energy system described with reference to FIG. 21 may also be used with simple 2-tariff retail schedule using dual accumulation meters and two separate circuits within the second electrical network. That is, an off-peak tariff meter using simple tamper proof timer switch can also enable the function of load-shifting.

In the case of an end-user having the ability to store and retrieve sufficient energy capacity at different time-of-use tariffs this enables a relatively straightforward implementation using an off-peak accumulation meter. Retrofit to existing end-user second network without the necessity of installing remote controlled TOU metering in this case would be seen as a particular advantage.

Clearly, load shifting principle as shown in the embodiment above can result in a cost saving of 2.3× (i.e., 58%) over a distributed consumption spanning all TOU tariff windows.

In event of a communications lapse where the pricing information from the first electrical network cannot be received, the end-user seeks a predetermined and agreed TOU tariff structure over a period (e.g., 28 days) with the retailer and a savings can still be realised by using load-shifting method in accordance with methodologies described above. The TOU tariff comprising a least a two tariff step level specifically for off-peak consumption and yet another tariff for any-time consumption. That is, at least two accumulation meters at the end-user are provided with at least one timed meter for off-peak usage accumulation. The timed off-peak accumulator further comprising an optional switch that provides off-peak power connection to the first network only at predetermined time intervals. Such a minimum metering configuration between the first electrical network and the second electrical network enables load-shifting method as disclosed. However, as is apparent, a substantially larger benefit to the end-user is possible using real-time load management and an opportunistic storage device that is charged using lowest cost availability of power.

Attributes of the various embodiments previously described include:
(i) the timely interrogation and receiving of a first electrical network pricing information including forecasted demand and cost and feed-in pricing for supply of electrical power from the second electrical network; and
(ii) a process for coupling the forecast with a subsequent decision engine for the creation of an end-users demand response.

The demand response creates a linked temporal event list comprising of a number of switching events with specific times for holding a given switched state within the second electrical network. This linked temporal list is required to implement a given end-user demand response which as discussed above may include supply power to the first electrical network. Referring again to FIG. 10, it is readily shown the demand response events are potentially frequent and of variable time period and will be directly reflected in the tasks required by the second electrical network transfer switch states. During periods of high demand in the first electrical network it is common place for the regional spot price to vary considerably especially during anomalous periods such as heat waves and or during network disruptions causing scheduling conflicts and or limitations.

The switching between two generation sources supplying a common second electrical network load poses constraint of synchronising the temporal response of the transfer switch between sources. That is, prior to switching between the first electrical network and second electrical network voltages sources, the relative phases of the two sources may be required to be synchronised to prevent reactive surges and deleterious feedback of electromotive force. This is readily achieved by monitoring the phase of a first electrical network and locking or timing the phase of the second electrical network on-site generator to the first electrical network phase. In preference, the voltage output of the on-site generator is slightly higher or equal to that of the first electrical network equivalent voltage source. This can be achieved by the following process.

The on-site generator 1750 can be scheduled and dispatched with small time interval prior to the demand response load requirement within the second electrical network. Once the control device is provided with acknowledgement that the generator 1750 is synchronised with the first electrical network, then the smart transfer switch can be initiated to cross-over from the first electrical network. Alternatively, the second electrical network generator 1750 can co-generate with the first electrical network and the excess power not consumed by the second electrical network load supplied as excess to the first electrical network. An essential function of the power conditioning module 1740 is therefore to provide sensing of the first electrical network phase and a synchronisation of the on-site power generation phase to that of the first electrical network. This is capable of providing seamless transfer from the viewpoint of the end-user load 1725 or 2125.

The generator within the second electrical network can be on-demand or renewable source or discharge 1750 of storage module 2150.

Figure 26:
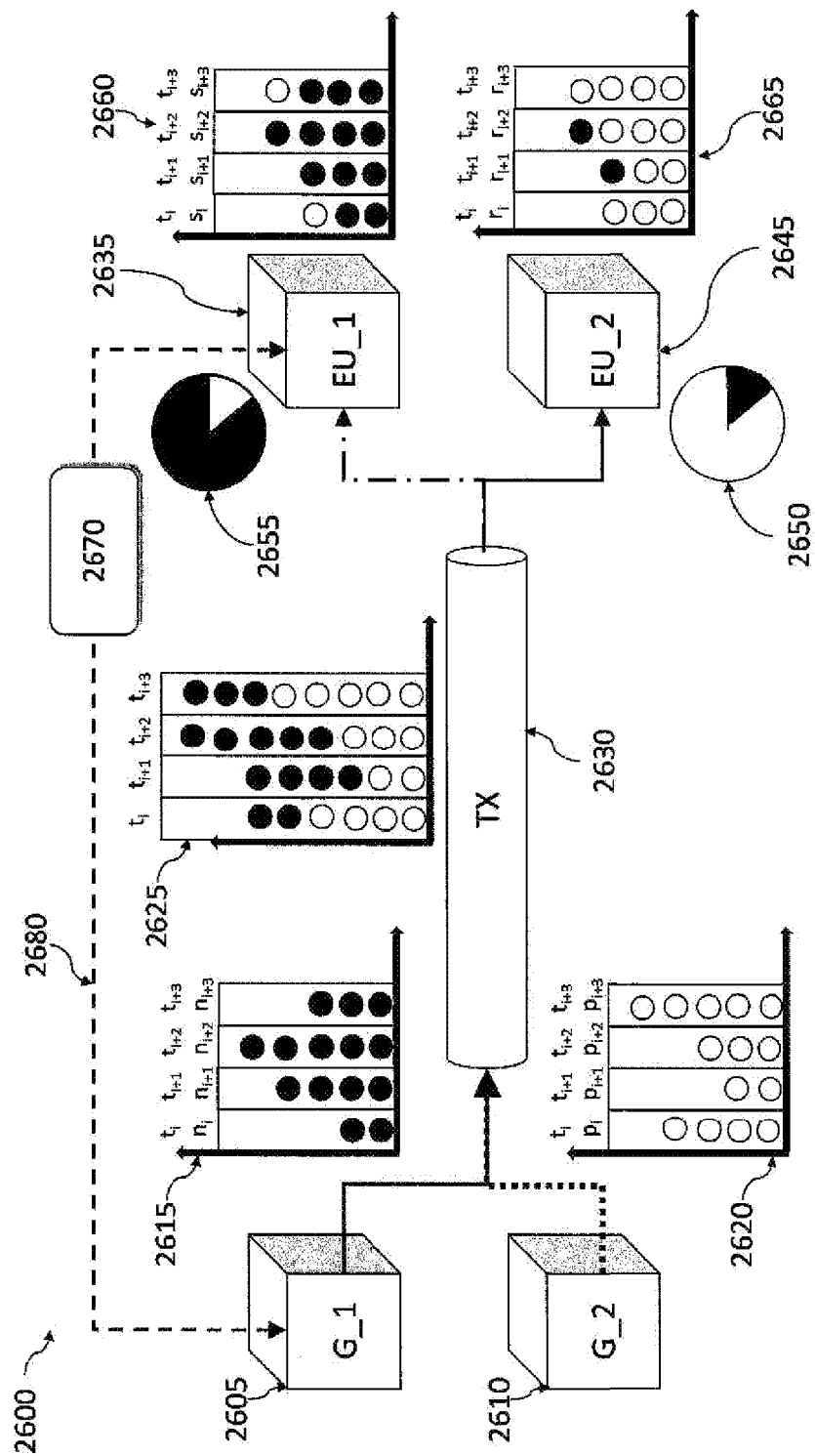
FIG. 26 is a system flow diagram showing a method for de-multiplexing power from a plurality of multiplexed power generation assets interconnected within a first electrical network according to an illustrative embodiment.

Referring now to FIG. 26, there is shown an illustrative embodiment where there are two independent generation assets 2605 and 2610 interconnected to a first electrical network transporting electrical power along a combined transportation channel 2630. Two end-users 2635 and 2645 are simultaneously connected to the first electrical network 2630. End-user 2645 has no information relating to the temporal energy proportions provided by the generation assets 2605 and 2610. End-user 2635 has temporal information of the power generation asset 2605 via a communication link 2680 and controller 2670 which controls the demand profile of end-user load 2635.

Generation asset 2605 produces temporal power forecast 2615 shown as time segment $t_1$ generating $n_i$ electrons, shaded as black circles. Likewise, generation asset 2610 provides a generation forecast to the first network shown as 2620 with amount of electrons $p_i$ symbolized by the open circles. As end-user 2635 has knowledge of energy mix of electrons supplied to the first electrical network, the energy mix of consumed electrons 2660 can be distinguished or de-multiplexed temporally from the generation asset 2605. Therefore, the energy mix 2655 for end-user 2635 can negotiate to purchase power from a specific generator. End-user 2645 has energy consumption profile 2665 and energy mix 2650 which is the remainder of electrons produced by the multiplexed transmission of power from the first electrical network.

The embodiments described here address one of the primary disadvantages of known electricity market management systems including smart grids where due to a lack of transparency the end-user is not provided with sufficient information to fully leverage time-of-use tariffs nor negotiate a tailored tariff structure based on their particular load profile and or consumption habits. In addition for those embodiments including on-site generation of electricity an end-user may advantageously feed-in electricity to the smart-grid or use this on-site generation based on timely pricing information received from the market operator. For those embodiments where a second electrical network includes an on-site storage facility an end-user may store low cost electricity provided by the supplying network at any given time for the purpose of network load-shedding.

For example, opportunistic consumption of low cost energy made available from renewable semi-dispatchable generation within the smart-grid which cannot be otherwise traded to other market regions. That is, a means is provided for consuming low cost electricity from the smart-grid to perform load shedding which can then be returned to the smart grid at a time advantageous to the end-user.

Enabling the second electrical network to provide and schedule demand response due to problematic forecast peak demand events as referred to in the various described embodiment addresses a fundamental issue faced by first electrical network providers in managing these peak demand events and reduces cost exposure and reliability of supply to second electrical network end-users.

As would be appreciated, the various illustrative logical blocks, modules, circuits, and algorithm steps described in connection with the embodiments disclosed in the specification may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Further, the steps of a method or algorithm described in connection with the embodiments disclosed herein may be embodied directly in hardware, in a software module executed by a processor, or in a combination of the two. The software module may contain a number of source code or object code segments and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for controlling the transfer of electrical power between a first electrical network and an end-user second electrical network, wherein the first electrical network is an electrically interconnected utility-scale grid under the control of a market operator comprising at least one power generation source, and comprising a transmission and/or distribution interconnection network operable to supply power from the electrically interconnected utility-scale grid to the end-user second electrical network, comprising:

determining by the at least one generation source or market operator a temporal power pricing forecast based on a future generation and supply capacity of the at least one power generation source to the electrically interconnected utility-scale grid;

determining by the end-user second electrical network an end-user temporal demand forecast based on the future demand of the end-user second electrical network for a future time window, wherein the end-user temporal demand forecast is determined in accordance with a predictive neural network based model of the end-user second electrical network, wherein the predictive neural network based model characterizes a required electrical input from the first electrical network desired electrical output operating characteristics of the end-user second electrical network;

operably linking the end-user second electrical network to the first electrical network based on the end-user second electrical network committing to the end-user temporal demand forecast for the future time window; and supplying electricity by the first electrical network to the end-user second electrical network for the future time window in accordance with the end-user temporal demand forecast.

2. The method of claim 1, wherein the temporal power pricing forecast includes time-of-use (TOU) tariff data for the first electrical network.

3. The method of claim 1, wherein the end-user temporal demand forecast is generated in real time.

4. The method of claim 3, wherein the end-user temporal demand forecast includes a consumption cost forecast for the end-user second electrical network.

5. The method of claim 1, wherein the end-user temporal demand forecast includes a consideration of the-electrical load requirements of one or more electrical power consuming components or devices of the end-user second electrical network.

6. The method of claim 1, wherein the end-user temporal demand forecast includes a consideration of an on-site electrical generating capability and wherein the end-user second electrical network is capable of any one of:
isolating at least a portion of the end-user second electrical network from the first electrical network and consuming electrical power generated on-site; or
isolating at least a portion of the end-user second electrical network and providing electrical power from the end-user second electrical network to the first electrical network.

7. The method of claim 6, wherein the on-site electrical generating capability of the end-user second electrical network is based on any one of:
solar energy source for a photovoltaic generator;
solar energy source for thermal generation of steam driven electromechanical generator;
solar energy source for a thermoelectric generator;
wind energy for an electromechanical generator;
geothermal source for producing a steam driven electromechanical generator;
landfill gas for combustion based generation of electricity;
fossil fuel for combustion based generation of electricity;
fossil fuel for electrochemical generation of electricity;
thermal energy source for electromechanical generation of electricity; or
any combination of the above.

8. The method of claim 6, wherein the temporal power pricing forecast includes a time dependent feed-in tariff forecast for the supply of electrical power from the end-user second electrical network to the first electrical network.

9. The method of claim 8, wherein the end-user temporal demand forecast includes a consideration of a capability of the end-user second electrical network to supply electrical power to the first electrical network in accordance with the time dependent feed-in tariff forecast of the first electrical network.

10. The method of claim 1, wherein the end-user temporal demand forecast includes a consideration of on-site storage of electrical power by the end-user second electrical network.

11. The method of claim 10, wherein the on-site storage of electrical power includes any one of:
reversible hydrogen-oxygen fuel cells;
fossil fuelled electrochemical fuel cells;
electrolyte batteries;
chemical batteries;
electromechanical flywheels;
compressible media to store energy which can be controllably released to impart rotational energy to drive conventional generation plants; or
any combination of the above.

12. The method of claim 10, further comprising supplying the electricity stored by the end-user second electrical network to the first electrical network in accordance with the end-user temporal demand forecast.

13. The method of claim 1, wherein the temporal power pricing forecast is received either from:
the market operator of the first electrical network; and/or
a retailer responsible for the supply of the electrical power from the first electrical network to the end-user second electrical network.

14. The method of claim 13, wherein an additional fossil fuel network is operably connected to the end-user second electrical network, and a fossil-fuelled generation plant is operably connected to the end-user second electrical network, and wherein the end-user temporal demand forecast includes a consideration of the fossil-fuelled generation plant.

15. The method of claim 1, wherein the desired electrical output operating characteristics of the end-user second electrical network are determined in accordance with a neural network based forecasting model trained on historical load data for the end-user second electrical network.

16. An electrical power switching system comprising:
a first electrical network, wherein the first electrical network is an electrically interconnected utility-scale grid under the control of a market operator comprising at least one power generation source and a transmission and/or distribution interconnection network operable to supply power from the first electrical network, the first electrical network determining a temporal power pricing forecast based on a future generation and supply capacity of the at least one power generation source to the electrically interconnected utility-scale grid;
an end-user second electrical network operably connectable to the first electrical network to allow electrical power to flow between the first electrical network and the end-user second electrical network, the end-user second electrical network determining an end-user temporal demand forecast based on the future demand of the end-user second electrical network for a future time window;
at least one power measurement device for providing a real-time measurement of the flow of electrical power between the first electrical network and the end-user second electrical network;
a power flow modulation device operable to modulate the electrical power consumption between the first electrical network and at least a portion of the end-user second electrical network; and
a controller receiving as input an output of the at least one power measurement device and operable to control the power flow modulation device for the future time window with time dependent programmable events determined in accordance with a predictive neural network based model of the end-user second electrical network, wherein the predictive neural network based model characterizes a required electrical input from the first electrical network desired electrical output operating characteristics of the end-user second electrical network, to modulate the transfer of electrical power between the first electrical network and the end-user second electrical network based on the end-user second electrical network committing to the end-user temporal demand forecast for the future time window.

17. The electrical power switching system of claim 16, wherein the controller is configured to reduce the overall power consumption in the end-user second electrical network based on a comparison between the end-user second electrical network's end-user temporal demand forecast and first electrical network's temporal power pricing forecast.

18. The electrical power switching system of claim 16, further comprising:
an on-site power generation plant for the end-user second electrical network controlled by the controller, the on-site power generation plant capable of supplying at least a portion of the end-user second electrical network's power requirements, wherein the temporal power pricing forecast includes a time dependent feed-in tariff forecast for the supply of electrical power from the end-user second electrical network to the first electrical network, and wherein the end-user temporal demand forecast includes a consideration of a capability of the on-site power generation plant to supply electrical power to the first electrical network in accordance with the time dependent feed-in tariff forecast for the first electrical network.

19. The electrical power switching system of claim 18, wherein the on-site power generation plant is fossil fuelled.

20. The electrical power switching system of claim 16, further comprising:
an on-site power storage plant for the second electrical network controlled by the controller, the power storage plant capable of supplying at least a portion of the end-user second electrical network's power requirements, wherein the temporal power pricing forecast includes a time dependent feed-in tariff forecast for the supply of electrical power from the end-user second electrical network to the first electrical network, and wherein the end-user temporal demand forecast includes a consideration of a capability of the on-site power storage plant to supply electrical power to the first electrical network in accordance with the time dependent feed-in tariff forecast for the first electrical network.

21. The electrical power switching system of claim 18, wherein the neural network based forecasting model is optimised to reduce the power consumption costs incurred from the first electrical network.

22. The electrical power switching system of claim 16, wherein the neural network based forecasting model is optimised to increase any power consumption cost incurred by the first electrical network for power supplied by the end-user second electrical network to the first electrical network.

23. The electrical power switching system of claim 16, wherein the desired electrical output operating characterisitics of the end-user second electrical network are determined in accordance with a neural network based forecasting model trained on historical load data for the end-user second electrical network.

24. An electrical power control system for interfacing an end-user to a supply electrical network, wherein the supply electrical network is an electrically interconnected utility-scale grid under the control of a market operator comprising at least one power generation source and a transmission and/or distribution interconnection network operable to supply power from the supply electrical network to the end-user, the system including:
at least one controller and an end-user load, the controller operable to determine or receive a temporal power pricing forecast based on a future generation and supply capacity of the supply electrical network and to determine or receive an end-user temporal demand forecast based on the future demand of the end-user for a future time window, wherein the end-user temporal demand forecast is determined in accordance with a predictive neural network based model of the end-user second electrical network, wherein the predictive neural network based model characterizes a required electrical input from the first electrical network desired electrical output operating characteristics of the end-user second electrical network;
at least one of an on-site power generation plant and/or a power storage plant controlled by the controller that forms an end-user electrical system configured to produce bi-directional electrical power transfer to and from the supply electrical network and the end-user;
a power measurement device for recording flow data associated with time dependent electrical energy flows between the supply electrical network and the end-user load, wherein the data collected by the power measurement device is capable of being interrogated or queried remotely by both a supply electrical network retailer and the end-user, the power measurement device operable to store flow data over a predetermined time period; and
at least one transfer switch controllable by the controller to modulate the transfer of electrical power between the supply electrical network and the end-user based on the end-user committing to the end-user temporal demand forecast for the future time window.

25. The electrical power control system of claim 24, wherein the temporal power pricing forecast comprises substantially real-time pricing information from the market operator.

26. The electrical power control system of claim 24, wherein the end-user temporal demand forecast is generated in real time.

27. The electrical power control system of claim 24, wherein the neural network based forecasting model is optimised to reduce the power consumption costs incurred from the supply electrical network.

28. The electrical power control system of claim 24, wherein the neural network based forecasting model is optimised to increase any power consumption cost incurred by the supply electrical network for power supplied by the end-user to the supply electrical network.

29. The electrical power control system of claim 24, wherein the desired electrical output operating characteristics of the end-user second electrical network are determined in accordance with a neural network based forecasting model trained on historical load data for the end user second electrical network.

30. A method for controlling a time dependent transfer of electrical power by at least one generator interconnected within a first electrical network and a time dependent consumption of power by a second electrical network, wherein the first electrical network is an electrically interconnected utility-scale grid under the control of a market operator comprising at least one power generation source and a transmission and/or distribution interconnection network operable to supply power from the first electrical network to the second electrical network, comprising:

receiving at a second electrical network a temporal power pricing forecast determined by the first electrical network based on a future generation and supply capacity of a specific generation asset to the electrically interconnected utility-scale grid;

determining by the electrical network a second electrical network temporal demand forecast based on the future demand of the second electrical network for a future time window, wherein the second electrical network temporal demand forecast is determined in accordance with a predictive neural network based model of the end-user second electrical network, wherein the predictive neural network based model characterizes a required electrical input from the first electrical network desired electrical output operating characteristics of the end-user second electrical network;

negotiating with the specific generation asset of the first electrical network for a purchase of a forecast electrical power for a relevant negotiated time period corresponding to the future time window; and synchronising the second electrical network to the first electrical network for supply of electrical power for the relevant negotiated time period to the second electrical network.

31. The method of claim 30, wherein the specific generation asset is a renewable energy generation asset.

32. The method of claim 30, wherein the desired electrical output operating characteristics of the end-user second electrical network are determined in accordance with a neural network based forecasting model trained on historical load data for the end-user second electrical network.

* * * * *

UNITED STATES PATENT AND TRADEMARK OFFICE
CERTIFICATE OF CORRECTION

PATENT NO. : 12,407,164 B2
APPLICATION NO. : 18/319413
DATED : September 2, 2025
INVENTOR(S) : John Charles Ellice-Flint et al.

Page 1 of 1

It is certified that error appears in the above-identified patent and that said Letters Patent is hereby corrected as shown below:

In the Claims

Column 35, Line 1, Claim 1, delete "network" and insert -- network for --

Column 37, Line 2, Claim 16, delete "network" and insert -- network for --

Column 37, Line 49, Claim 21, delete "claim 18," and insert -- claim 16, --

Column 37, Lines 60-61, Claim 23, delete "characterisitics" and insert -- characteristics --

Column 38, Line 17, Claim 24, delete "network" and insert -- network for --

Column 38, Line 59, Claim 29, delete "end user" and insert -- end-user --

Column 40, Line 1, Claim 30, delete "desired" and insert -- for desired --

Signed and Sealed this
Twenty-first Day of October, 2025

John A. Squires
*Director of the United States Patent and Trademark Office*